(12) United States Patent
Kawagoe et al.

(10) Patent No.: US 6,179,328 B1
(45) Date of Patent: Jan. 30, 2001

(54) VEHICLE REAR SUSPENSION APPARATUS

(75) Inventors: Kenji Kawagoe; Hikaru Nakajima; Yukihiro Suetsugu, all of Kanagawa (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/059,432

(22) Filed: Apr. 14, 1998

(30) Foreign Application Priority Data

| Apr. 14, 1997 | (JP) | ................................................. 9-095544 |
| Dec. 3, 1997 | (JP) | ................................................. 9-332756 |
| Dec. 5, 1997 | (JP) | ................................................. 9-335673 |

(51) Int. Cl.[7] .............................. B60G 9/02; B62D 21/11
(52) U.S. Cl. ................................... 280/788; 280/124.106; 280/124.116
(58) Field of Search ..................... 280/124.116, 124.11, 280/124.106, 124.107, 124.128, 124.13, 124.111, 788

(56) References Cited

U.S. PATENT DOCUMENTS

| 2,182,248 | * | 12/1939 | Chayne | ........................ 280/124.116 |
| 4,410,201 | | 10/1983 | Iijima et al. . | |
| 4,589,677 | * | 5/1986 | Matschinsky | .................. 280/124.116 |
| 4,603,882 | | 8/1986 | Kijima et al. . | |
| 4,616,849 | * | 10/1986 | Matsumoto et al. | .......... 280/124.116 |
| 4,765,650 | * | 8/1988 | Kameshima et al. | ......... 280/124.116 |
| 4,786,074 | | 11/1988 | Muramatsu . | |
| 4,834,416 | | 5/1989 | Shimoe et al. . | |
| 5,098,116 | * | 3/1992 | Edahiro et al. . | |
| 5,246,248 | | 9/1993 | Ferguson . | |
| 5,380,036 | | 1/1995 | Perkins et al. . | |
| 5,439,243 | * | 8/1995 | Kato et al. | ..................... 280/124.106 |
| 5,445,404 | * | 8/1995 | Shida et al. | ................... 280/124.116 |
| 5,566,969 | | 10/1996 | Tattermusch . | |
| 5,636,857 | | 6/1997 | Tandy, Jr. et al. . | |

FOREIGN PATENT DOCUMENTS

| 27 42 426 | 3/1979 | (DE) . |
| 5-246223 | 9/1993 | (JP) . |
| 6-262921 | 9/1994 | (JP) . |
| 7-125516 | 5/1995 | (JP) . |

OTHER PUBLICATIONS

Suzuki Yukio, Patent Abstracts of Japan, JP 7125516, May 16, 1995.
Kato Yoichiro, Patent Abstracts of Japan, JP 6262921, Sep. 20, 1994.
Asami Kazumasa, Patent Abstracts of Japan, JP 9277812, Oct. 28, 1997.
Jornsen Reimpell, "Fahrwerktechnik, Radaufhangungen", Vogel Verlag, Wurzburg DE (XP002137733), 1988, pp 182–183.

* cited by examiner

Primary Examiner—Peter C. English
(74) Attorney, Agent, or Firm—Foely & Lardner

(57) ABSTRACT

A vehicle suspension apparatus includes an axle. The axle includes a pair of trailing arms with a transverse beam. Resilient bushings connect the forward ends of the trailing arms to the vehicle superstructure. A linkage mechanism connects the beam to the vehicle superstructure. Under force causing lateral displacement of the axle, the linkage mechanism induces moment on the beam to counteract oversteer tendency due to the lateral displacement of the axle.

9 Claims, 22 Drawing Sheets

VEHICLE REAR SUSPENSION APPARATUS

FIELD OF THE INVENTION

The present invention relates to vehicle wheel suspension apparatuses, and more particularly to an automotive rear suspension apparatus incorporating an axle that includes trailing arms with a beam that serves as an axle beam having wheel supports at each end thereof.

BACKGROUND OF THE INVENTION

JP-A 5-246223 discloses an automotive axle suspension incorporating a laterally extending link and a control rod to restrain lateral displacement of an axle with a transverse beam. At one end, the lateral link is pivotally connected to a portion of the vehicle superstructure on the vehicle longitudinal centerline. The lateral link has an opposite end pivotally connected to a portion of the beam. The control rod is pivotally connected at one end to a portion of the lateral link and at an opposite end to a portion of the beam. An anisotropic resilient bushing is operatively connected between the opposite end of the lateral link and the beam to accommodate by internal flexure longitudinal displacement of the lateral link.

JP-A 6-262921 discloses a compact anisotropic resilient bushing operatively disposed between one end of a lateral link and a transverse beam of an axle suspension of the kind taught by JP-A 5-246223.

JP-A 7-125516 discloses an automotive axle suspension incorporating a lateral link to restrain lateral displacement of an axle. At one end, the lateral link is pivotally connected to a first portion of the vehicle superstructure. The lateral link has an opposite end pivotally connected to a second portion of a transverse beam of the axle. The lateral link has a longitudinal link axis that interconnects a center of articulation at the one end thereof and a center of articulation at the other end thereof. The center of articulation at the one end of the lateral link is placed rearwards as compared to the center of articulation at the other end of the lateral link. Viewing this arrangement in a top plan view of the vehicle, the link axis is oriented at an angle with respect to the beam. Under a force causing lateral displacement of the axle, the lateral link pivots about the first portion of the vehicle superstructure to exert a force on the beam in a direction to suppress compliance oversteer.

SUMMARY OF THE INVENTION

A general object of the present invention is to provide an improved vehicle wheel suspension apparatus.

Specifically, an object of the present invention is to improve a vehicle wheel suspension apparatus of the above kind such that the performance when the vehicle negotiates a turn is improved with least modification on the part of the conventional structure of an axle.

According to the present invention, there is provided a wheel suspension apparatus for a vehicle, comprising:
an axle including a pair of trailing arms each having one end pivotally connected to the vehicle superstructure and a beam connected to said pair of trailing arms, said axle having wheel supports,
an interconnecting assembly connecting said axle with the vehicle superstructure, and
a linkage mechanism operatively connected between the vehicle superstructure and said beam, so that, under force causing lateral displacement of said axle, said linkage mechanism includes moment on said beam to counteract oversteer tendency due to said lateral displacement of said axle.

DESCRIPTION OF THE PREFERRED EMBODIMENTS

Figure 1:
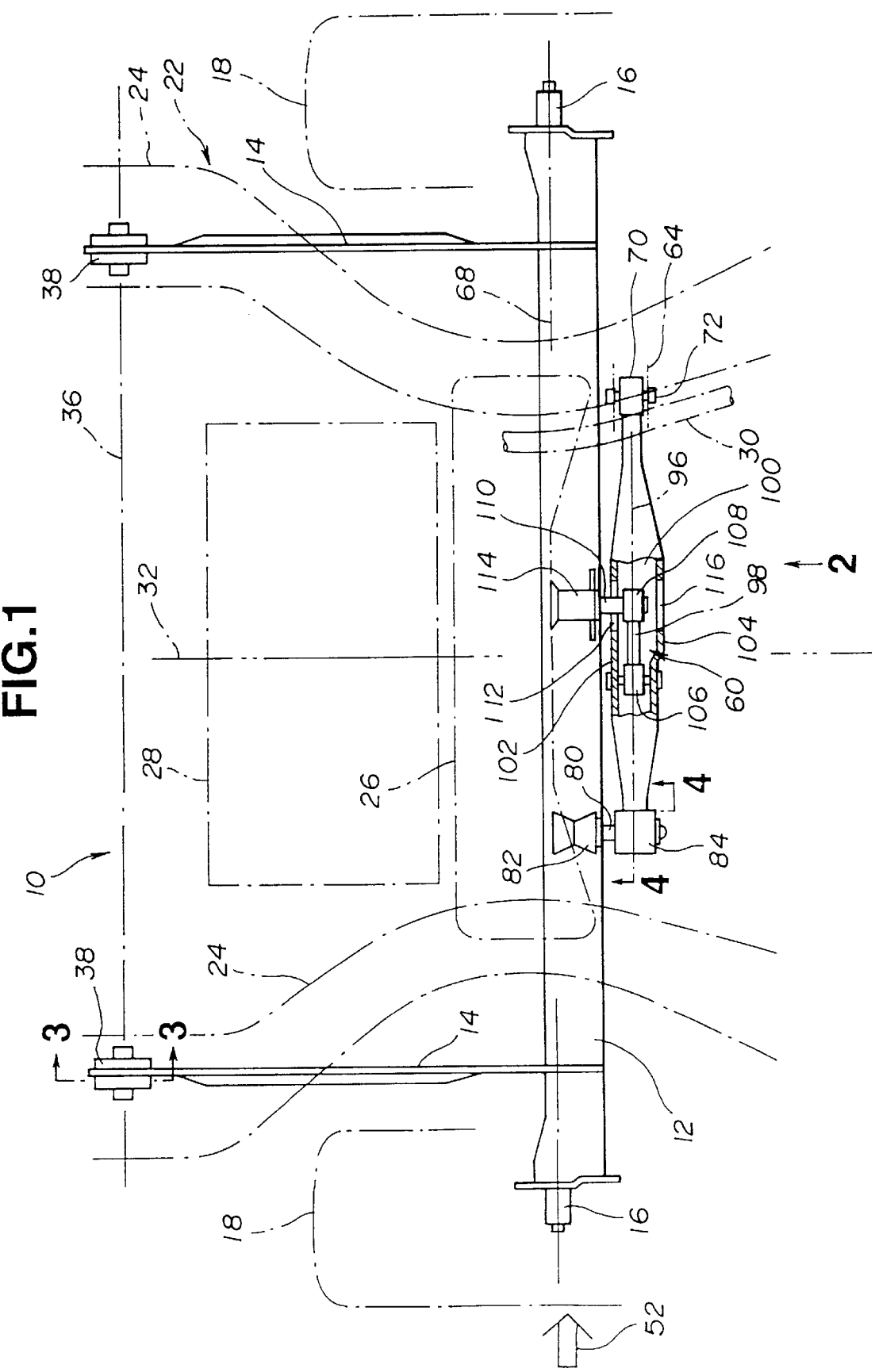
FIG. 1 is a plan view of a rear suspension apparatus for an automotive vehicle incorporating the present invention.
Figure 2:
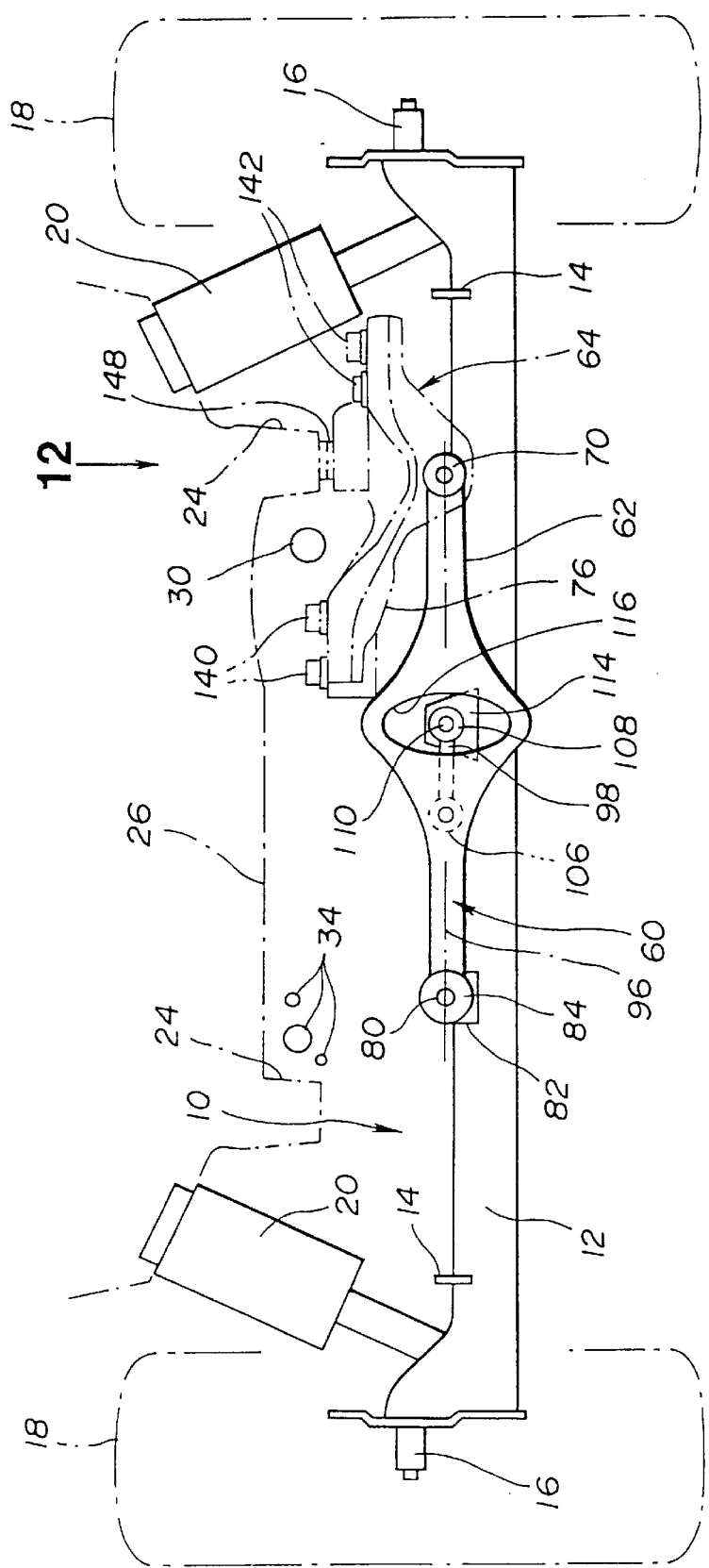
FIG. 2 is a rear view of the rear suspension apparatus viewing FIG. 1 in the direction of an arrow 2.

Referring now to the drawings in greater detail, FIGS. 1–4 illustrate an automotive vehicle rear suspension apparatus including a rear axle 10. The axle 10 includes a transverse beam 12 in the form of a torsion beam and a pair of trailing arms 14 rigidly attached to the beam 12. The beam 12 supports a wheel support member 16 in the form of a wheel hub at each outboard end. The wheel support members 16 carried at the outboard ends of the beam 12 each carry a wheel and tire unit which is indicated in phantom at 18. Conventional spring and hydraulic strut units 20 are placed between spring seats, not shown, on the axle 10 and counterpart seating locations or towers of the vehicle body superstructure which is indicated in phantom at 22. Each trailing arm 14 extends forwardly and is pivotally connected at its forward end to a side member, which is indicated in phantom at 24, of the vehicle superstructure 22. A cross member, which is indicated in phantom at 26, of the vehicle superstructure 22 is disposed in front of the beam 12 and rigidly attached at either end to the respective side member 24. Disposed in front of the beam 12 is a fuel tank, which is indicated in phantom at 28. A rearwardly extending exhaust pipe, which is indicated in phantom at 30 in FIG. 1, is partially illustrated. As seen in FIGS. 1 and 2, the exhaust pipe 30 crosses the beam 12 at a portion that is disposed between a vertical plane including the vehicle longitudinal centerline or axis 32 and the side member 24 near the wheel support 16 for the rear right wheel 18. In FIG. 2, fuel pipes 34 extend through a portion between the vertical plane including longitudinal axis 32 and the side member 24 near the wheel support 16 for the rear left wheel 18.

The axle 10 with its wheels and tires 18 are adapted to displace relative to the vehicle body 22 about respective forward ends of the trailing arms 14. The forward ends of the trailing arms 14 are interconnected on the vehicle body 22 on a common transverse axis 36 by resilient bushings adapted to accommodate such rotation therebetween in normal even-sided ride motions or in uneven, wheel bouncer/rebound occurrences at the opposite sides of the axle 10. Further, longitudinal road impacts on the wheels arising form chuckholes, tar strips, etc. are partially absorbed in the resilient bushings for a degree of isolation in that longitudinal direction.

Figure 3:
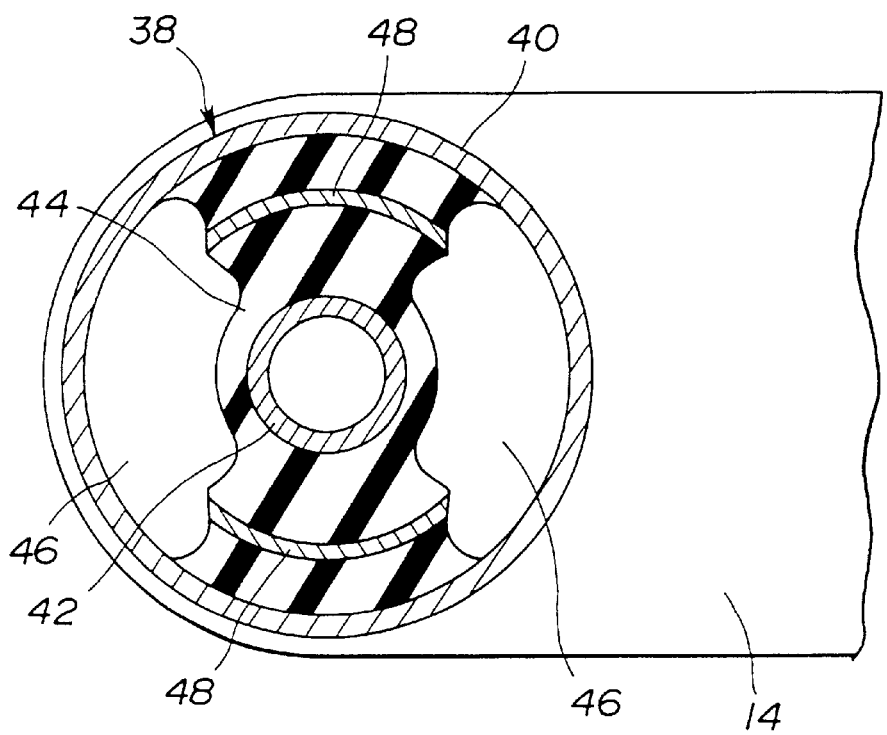
FIG. 3 is a view taken along the plane indicated by lines 3—3 of FIG. 1.

Resilient bushings, designated at 38, serve for such functions. Referring to FIGS. 1 and 3, the interconnecting assembly includes, in this embodiment, a single anisotropic resilient bushing 38 at each arm 14. The forward end of each arm 14 rigidly supports an outer cylindrical element or sleeve 40 of each bushing 38. The cylindrical elements 40 are of rigid material. Each bushing 38 incorporates an inner cylindrical element or sleeve 42 of rigid material. An anisotropic structure includes an elastic body 44 in the form of a generally cylindrical rubber ring. The elastic body 44 is disposed between the inner and outer sleeves 42 and 40 and securely bonded throughout its length to both thereof. As viewed in transverse cross-section of each bushing 38 (see FIG. 3), the cylindrical conformation of elastic body 44 is interrupted in two segments or regions of each bushing, over approximately 90 degrees, to define voids 46. In each of the remaining regions, a plate 48 of stamped metal is molded in situ within the elastic body 44 and extends in a cylindrical shape throughout such region .The plates 48 and voids 46 contribute to properties of each bushing 38.

The axle 10 is interconnected with the vehicle body 22 by tightening a bolt fastener assembly through reception of the bolt within each inner sleeve 42.

In operation, the thickness in each bushing 38 of the elastic body 44, together with plates 48 and voids 46 provide a requisite amount of rotary compliance necessary for relative vertical displacement of the axle and body as well as appropriate impact or shock isolation longitudinally of the vehicle. The voids 46 contribute added amounts of fore/aft shock isolation or compliance.

Referring to FIG. 1, for example, when the vehicle negotiates a right turn, a road reaction force typically occurs as indicated by an arrow 52 at the rear left wheel and tire 18. This induces relative lateral displacement between axle 10 and body 22 in the direction of that arrow. Concomitantly, the tire force ordinarily induces a moment on the axle 10 through the bushings 38 tending to displace their elastic bodies 44 and relatively rotate the axle counterclockwise of that Figure, in an oversteer mode.

However, a linkage mechanism 60, which is operatively connected between the vehicle body 22 and the beam 12, counteracts that tendency to oversteer. The linkage mechanism 60 is compactly arranged in the proximity of the beam 12 and includes resilient bushings and a link 62 connected to the beam 12. At least as viewed in the plan view, the link 62 extends laterally and is pivotally connected at its outboard end to a bracket 64 that depends from the vehicle body 22. The linkage mechanism 60 utilizes displacement in the bushing parts to induce a clockwise moment on the beam 12, thereby inducing a clockwise relative rotation between the axle 10 and body 22.

The linkage mechanism 60, in this embodiment, is arranged behind the beam 12. Specifically, the major parts of the linkage mechanism 60 are disposed in a predetermined zone that is bounded by a vertical plane 68, which is vertical with respect to the vehicle body 22 and bisects each wheel support member 16. This predetermined zone extends rearwards with respect to the vehicle longitudinal axis or centerline 32 from the vertical plane 68. For explanation purpose, this vertical plane 68 is assumed to be a vertical plane that bisects each wheel support member 16 in the following description.

Figure 12:
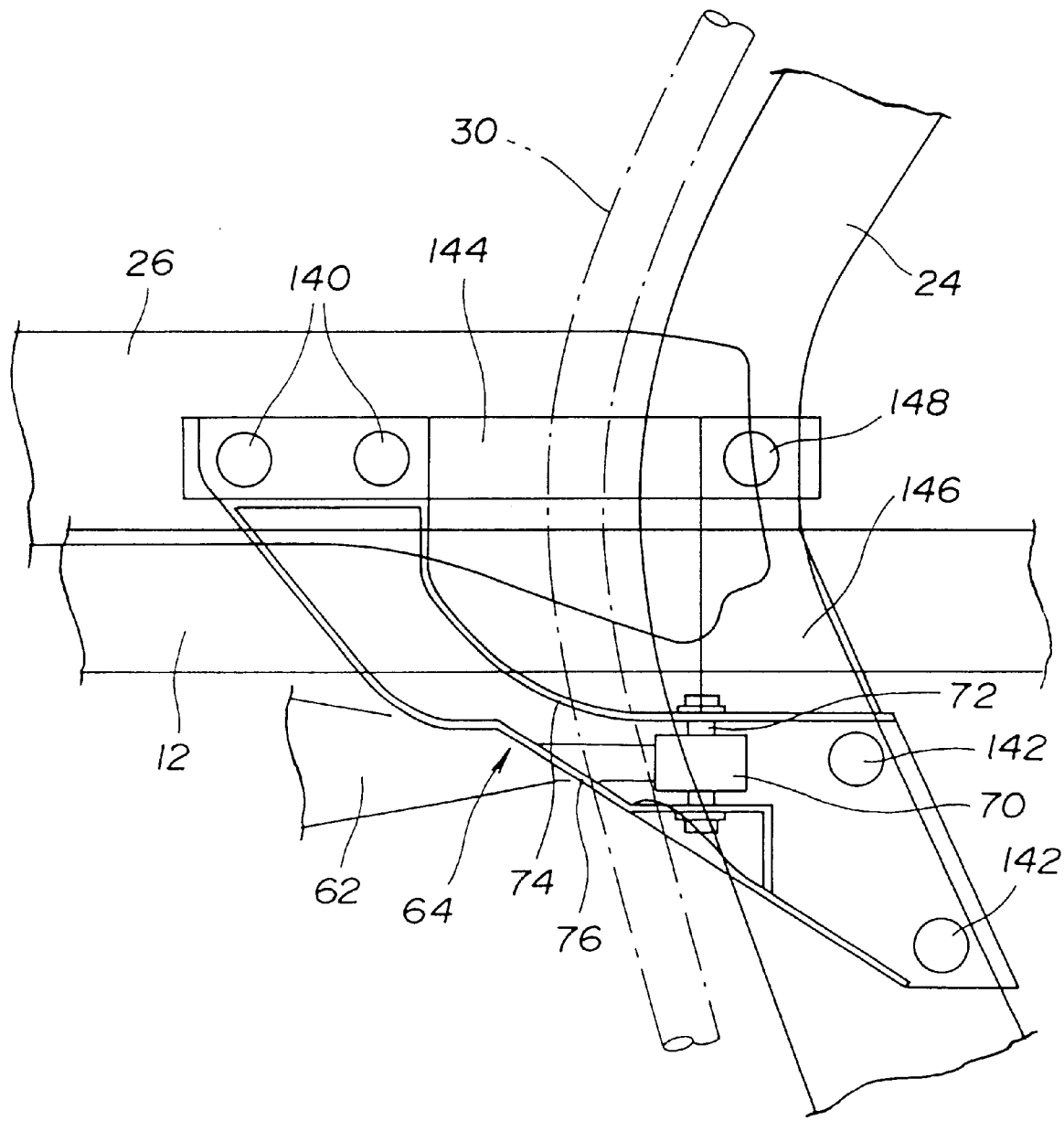
FIG. 12 is an enlarged plan view, partially broken away, of a portion of FIG. 2 as viewed in the direction of an arrow 12.
Figure 13:
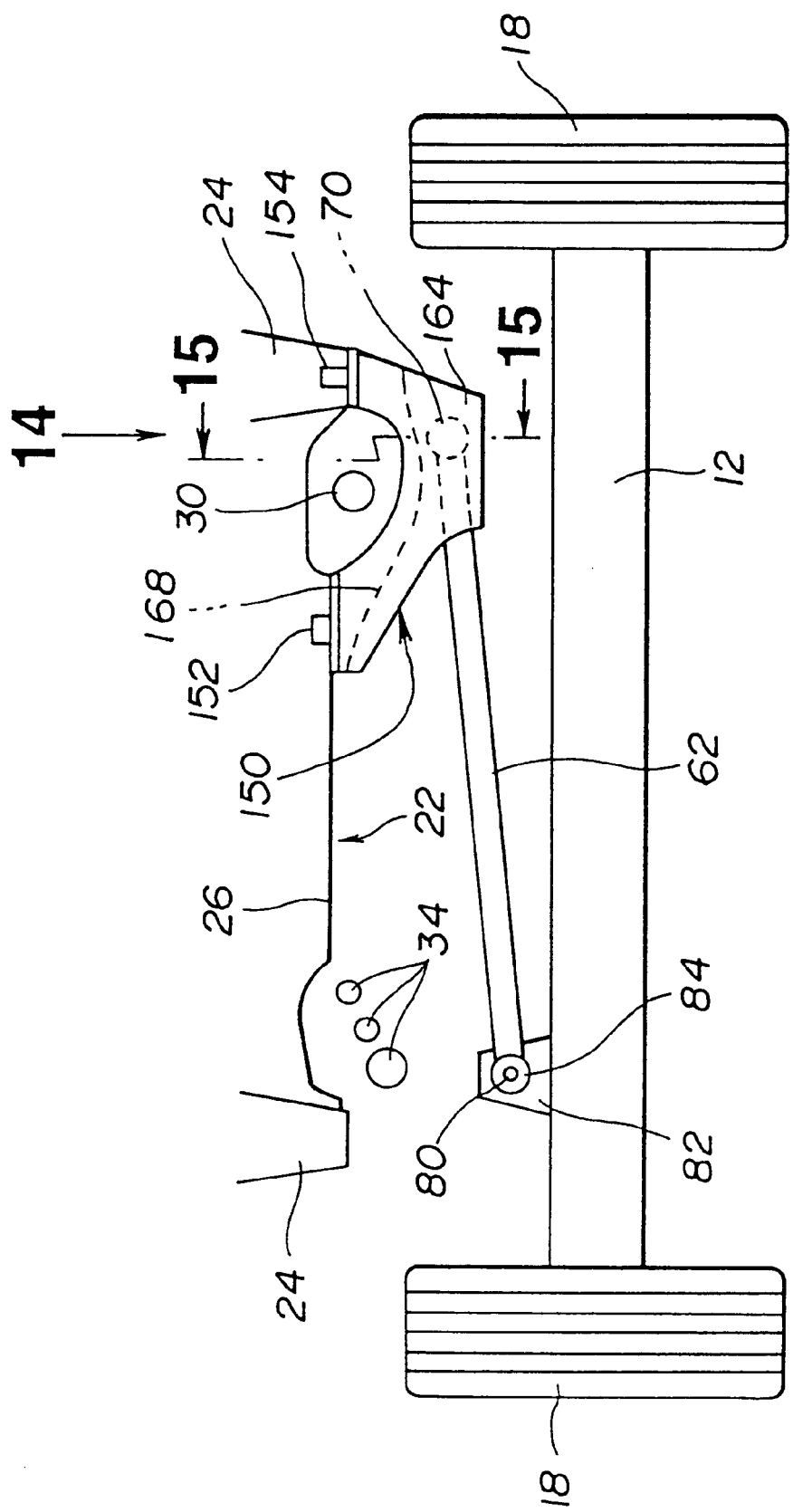
FIG. 13 is a similar view to FIG. 2 showing, in schematic, the fourth embodiment of a rear suspension apparatus according to the present invention.
Figure 14:
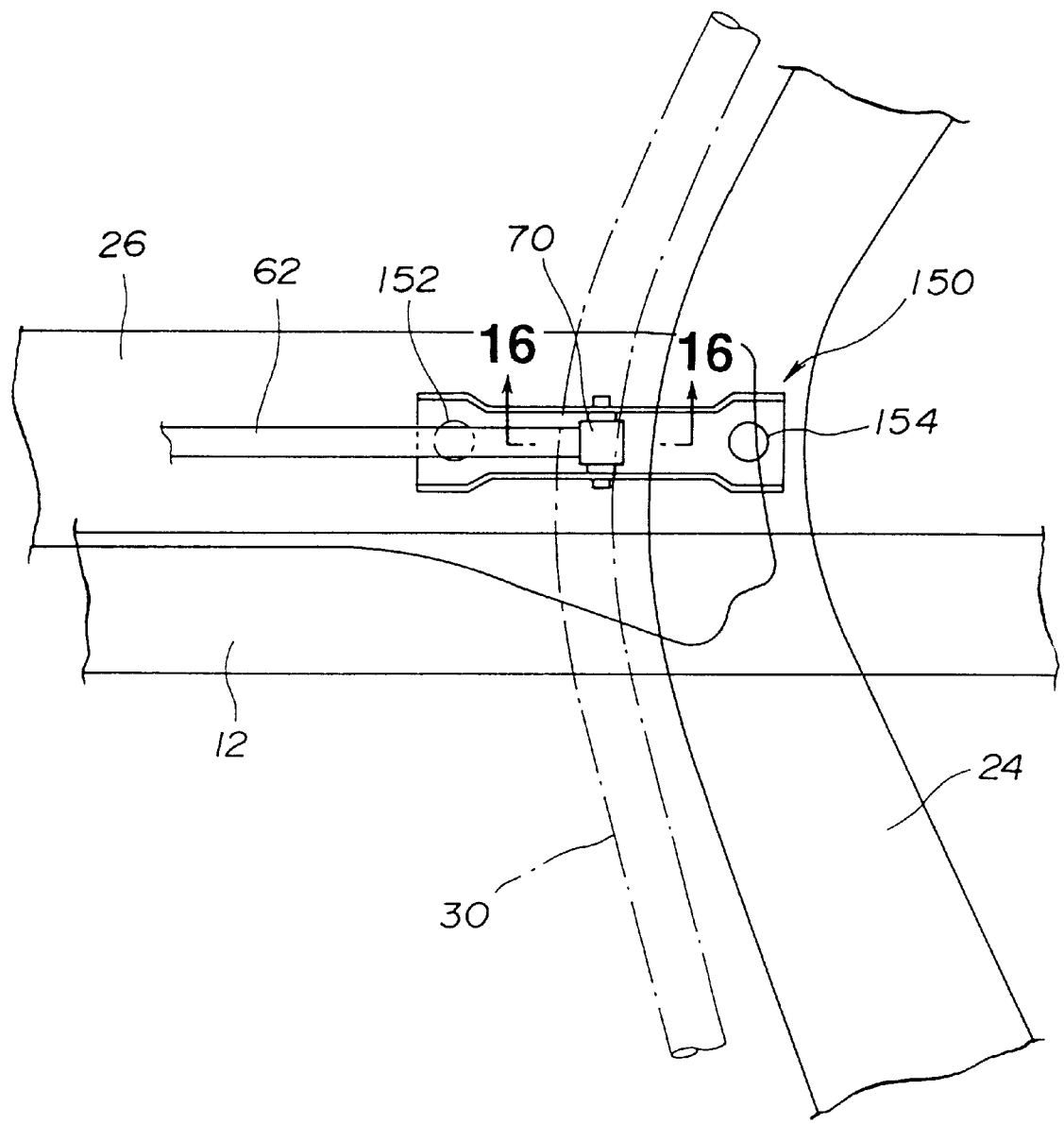
FIG. 14 is an enlarged plan view, partially broken away, of a portion of FIG. 13 as viewed in the direction of an arrow 14.

A resilient bushing 70 is operatively disposed between the outboard end of the lateral link 62 and the bracket 64. Referring also to FIG. 12, A bolt 72 of a fastener assembly extends through an inner rigid element or sleeve, not shown, of the bushing 70 and bridges an opposite pair of bracket walls 74 and 76. The bushing 70 includes an elastic or rubber ring, not shown, bonded between the inner sleeve and an outer rigid element or sleeve rigidly connected to or integrally formed as a part of the outboard end of the lateral link 62. The bushing 70 is of the well-known type in which the inner and outer sleeves are concentric in its unstressed state. As viewed in the plan view of FIG. 1, the concentric axis or bushing axis of the bushing 70 is oriented in parallel relation to the vehicle longitudinal centerline 32.

The lateral link 62 extends through the vertical plane, which includes the vehicle longitudinal centerline 32, laterally toward a pin 80. The pin 80 is rigidly attached to a bracket 82 that is mounted on the beam 12 and extends rearwards from the vertical pane 68. The pin 80 is oriented in parallel relation to the vehicle longitudinal centerline 32. As viewed in FIG. 2, in an unstressed state, the pin 80 and bolt 72 lie in a common horizontal plane with respect to the vehicle body 22. The lateral link 62 has the opposite outboard end for pivotal connection to the beam 12 about the pin 80.

Figure 4:
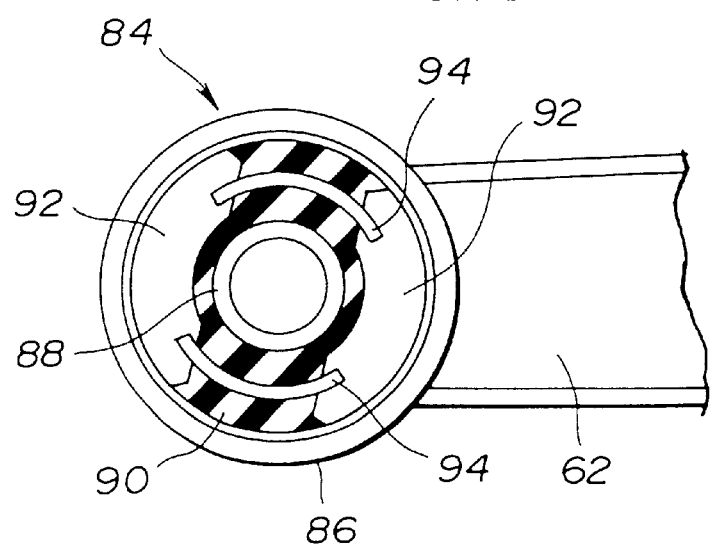
FIG. 4 is a view taken along the plane indicated by lines 4—4 of FIG. 1.

A resilient bushing designated at 84 serves for such function. Referring to FIG. 4, the resilient bushing 84 in this embodiment is of the anisotropic type substantially the same in structure as the resilient bushing 38 shown in FIG. 3. The opposite outboard end of the link 62 rigidly supports an outer cylindrical element or sleeve 86 of rigid material. The bushing 84 incorporates an inner cylindrical element or sleeve 88 of rigid material. An anisotropic stricture includes an elastic body 90 in the form of a generally cylindrical rubber ring. The elastic body 90 is disposed between the inner and outer sleeves 88 and 86 and securely bonded throughout its length to both thereof. As viewed in transverse cross-section of the bushing 84 (see FIG. 4), the cylindrical conformation of elastic body 90 is interrupted in two segments or regions of the bushing, over approximately 90 degrees, to define voids 92. In each of the remaining regions, a plate 94 of stamped metal is molded in situ within the elastic body 90 and extends in a cylindrical shape throughout such region. The plates 94 and voids 92 contribute to properties of the bushing 84. The opposite outboard end of the link 62 is connected to the axle 10 through reception of the pin 80 through the inner sleeve 88. Although not shown, a fastener is tightened to secure this connection. The thickness of the elastic body 90, together with the voids 92 provide a requisite amount of softness necessary for relative lateral displacement of the beam 12 and the link 62. The link 62 has a link axis 96 that interconnects a center of articulation at the one outboard end and a center of articulation at the opposite outboard end. As viewed in the plan view of FIG. 1, the link axis 96 is in parallel relation to and spaced rearwards from the vertical plane 68 by a predetermined amount.

The linkage mechanism 60, in this embodiment, includes a control rod 98 that is mounted within a space 100 defined between a pair of opposite spaced walls 102 and 104 of the link 62. As viewed in the plan view of FIG. 1, the control rod 98 extends along the link axis 96 between a pivotal connection 106 on the walls 102 and 104 and a pivotal connection 108 including a pin 110. This pin 110 extends rearwards from a bracket 114 secured to the beam 12 into the space 100 through a window 112 in the wall 102. This window 112 is dimensioned to allow necessary relative displacement of the link 62 and the beam 12. For inspection of the pivotal connection 108, a window 116 is formed in the wall 104. The pivotal connections 106 and 108 each include a resilient bushing.

Suppose in FIG. 1 that the vehicle negotiates a right turn and a side lateral force as indicated by arrow 52 is applied to the beam 12. At least a portion of this side force is exerted on the link 62 longitudinally through the bracket 114, pin 110, pivotal connection 108, control rod 98, and pivotal connection 106. Reaction due to the exertion of force induces a clockwise moment on the beam 12 about a center that is disposed, in this embodiment, at or in the proximity of the connection between the pin 110 and bracket 114. The anisotropic resilient bushing 84 minimizes the execution of this reaction on the beam 12 through the pin 80. This contributes to occurrence of such moment on the beam 12. This moment induces relative clockwise rotation of the axle 10 and body 22 to counteract the oversteer tendency. This clockwise rotation of the axle 10 is facilitated by the use of anisotropic resilient bushings 38 of the interconnection assembly. The extent to which such rotation occurs will be the result of a number of design factors including thickness of elastic bodies of resilient bushings 38 and 70 and orientation of voids 46 and 92.

Figure 5:
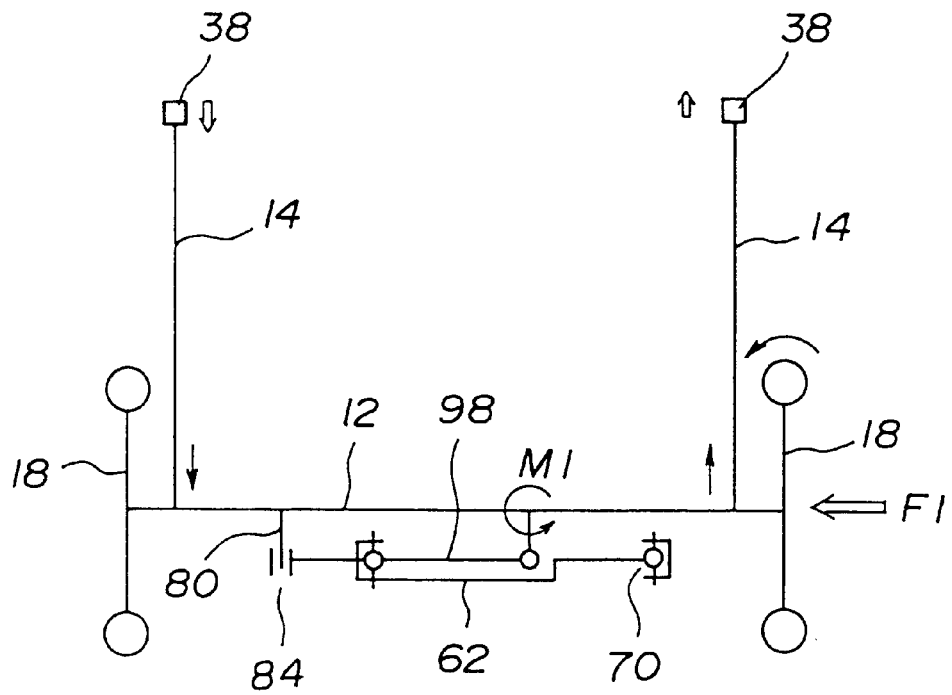
FIG. 5 is a schematic view of FIG. 1 showing the apparatus under side force causing in a first or horizontal plane lateral displacement of an axle during the vehicle left-turn cornering.

Referring to FIG. 5, when the vehicle negotiates a left turn, a side force F1 exerted on the beam 12 induces a counterclockwise moment M1, inducing relative counterclockwise rotation of the axle 10 to displace the rear right wheel and tire 18 in a direction toward understeer tendency.

Figure 6:
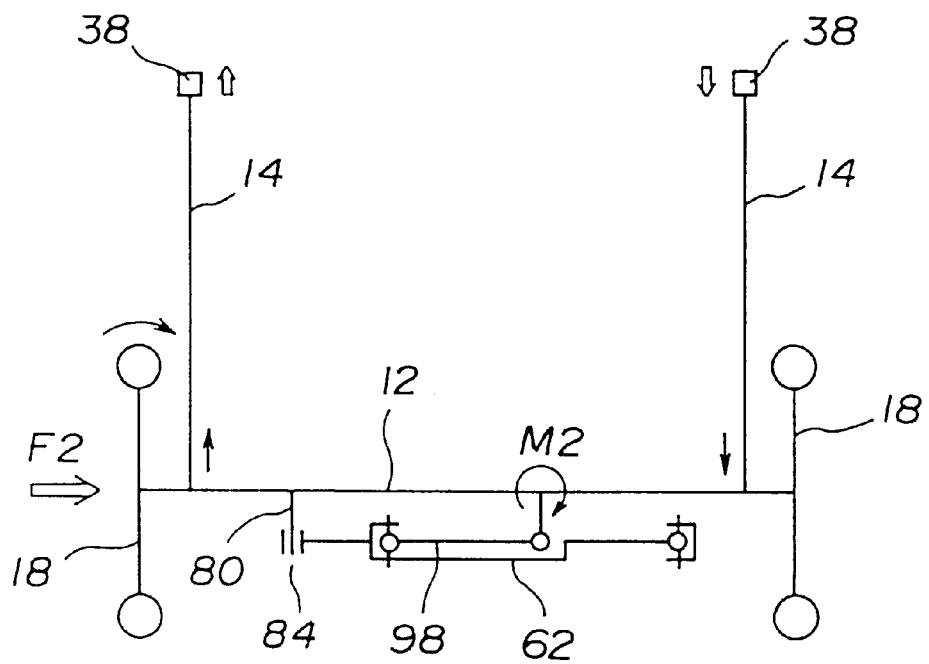
FIG. 6 is a schematic view of FIG. 1 showing the apparatus under side force causing in a first or horizontal plane lateral displacement of the axle during the vehicle right-turn cornering.

Referring to FIG. 6, when the vehicle negotiates a right turn, a side force F2 exerted on the beam 12 induces a clockwise moment M2, inducing relative clockwise rotation of the axle 10 to displace the rear wheel and tire 18 in a direction toward understeer tendency.

With respect to the location of the center of moment induced by the linkage mechanism 60, the center of location may be placed at an intermediate portion on the beam 12 equidistant from the ends thereof. According to this arrangement, the moments M1 and M2 induced by the side forces F1 and F2 of the same magnitude become the same in magnitude. It will be appreciated that this modification can be made without any modification of the lateral link 62 in its longitudinal length.

It will be seen from FIG. 1 that the center of moment provided by the linkage mechanism 60 stays in the predetermined zone. This zone is bounded or limited by the vertical plane 68 with respect to the vehicle superstructure 22 and extends rearwards with respect to the vehicle longitudinal centerline or axis 32 from this plane 68.

Figure 7:
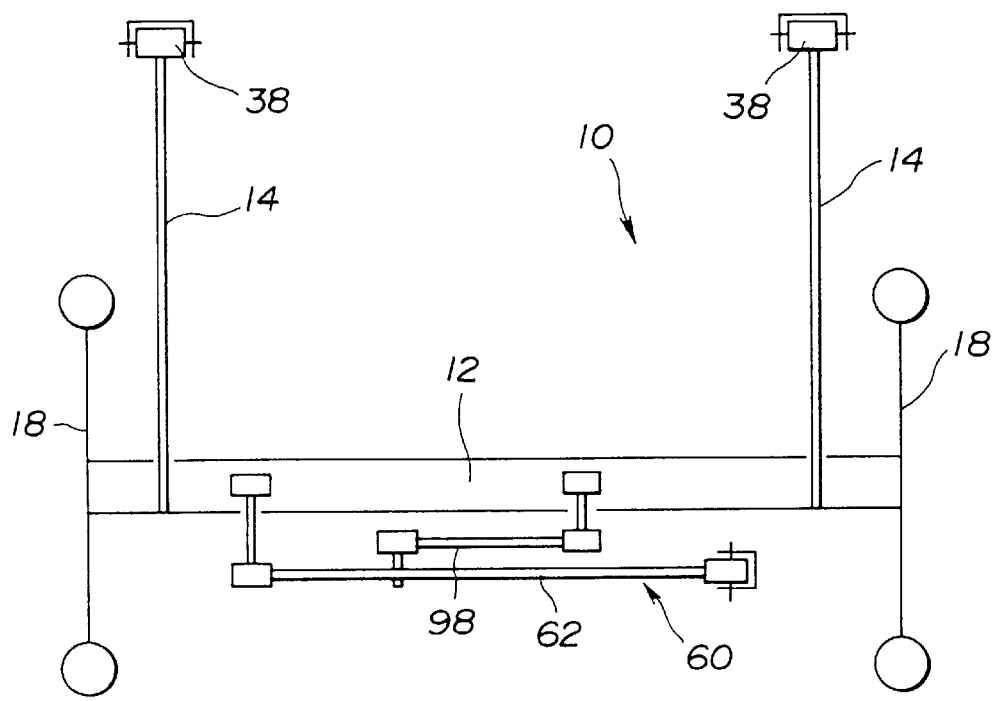
FIG. 7 is a schematic view similar to FIG. 5 showing the second embodiment of a rear suspension apparatus.

The control rod 98 has a rod axis that interconnects a center of articulation at one pivotal connection 106 and a center of articulation at the other pivotal connection 108. With respect to the layout of the control rod 98, the control rod axis, in this embodiment, is in parallel relation to the vertical plane 68 and displaced rearwards therefrom by the same amount as the link axis 96 is. If desired, the control rod 98 may be arranged between the lateral link 62 and the beam 12 as shown in FIG. 7 with substantially the same result.

With respect to the structure of the anisotropic resilient bushing, the voids may be replaced by any other appropriate means as long as a desired amount of softness in lateral displacement between the outer and inner sleeves along a desired orientation is provided. Such appropriate means include different setting in thickness of the elastic body in the desired orientation.

Figure 8:
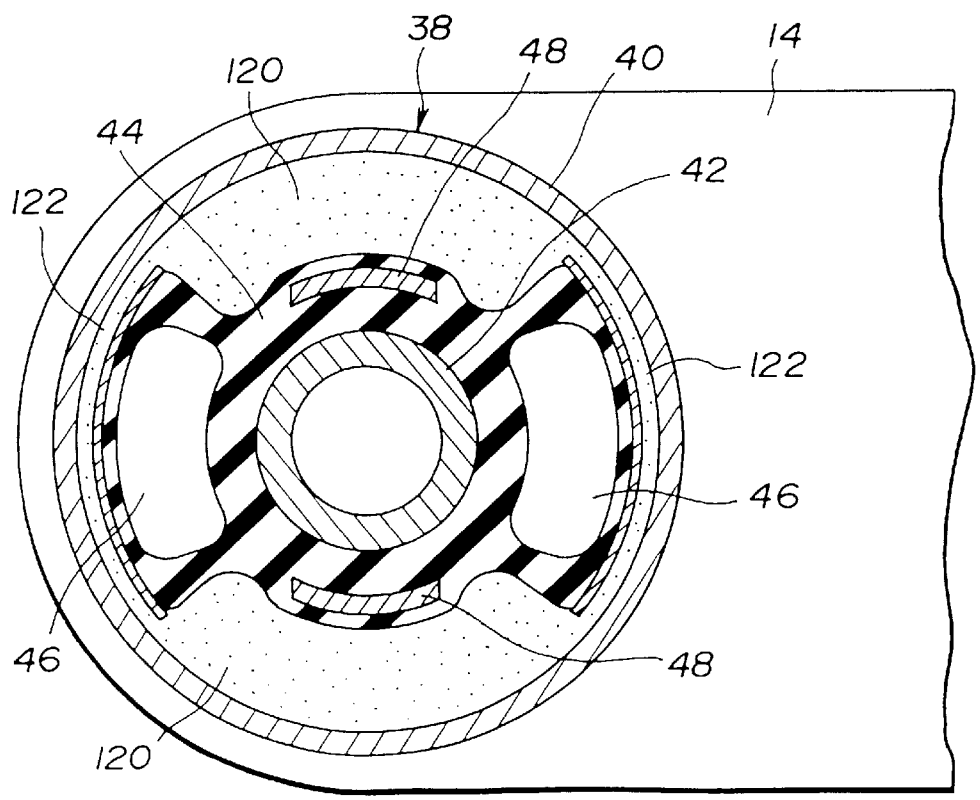
FIG. 8 is a similar view to FIG. 3 showing a modification of an anisotropic resilient bushing.

Referring to FIG. 8, if it is desired to add rigidity in a vertical direction of this Figure, a pair of diametrically opposed liquid filled chambers 120 may be defined around an inner sleeve 42. These chambers 120 are interconnected by orifices or restricted passages 122.

Figure 9:
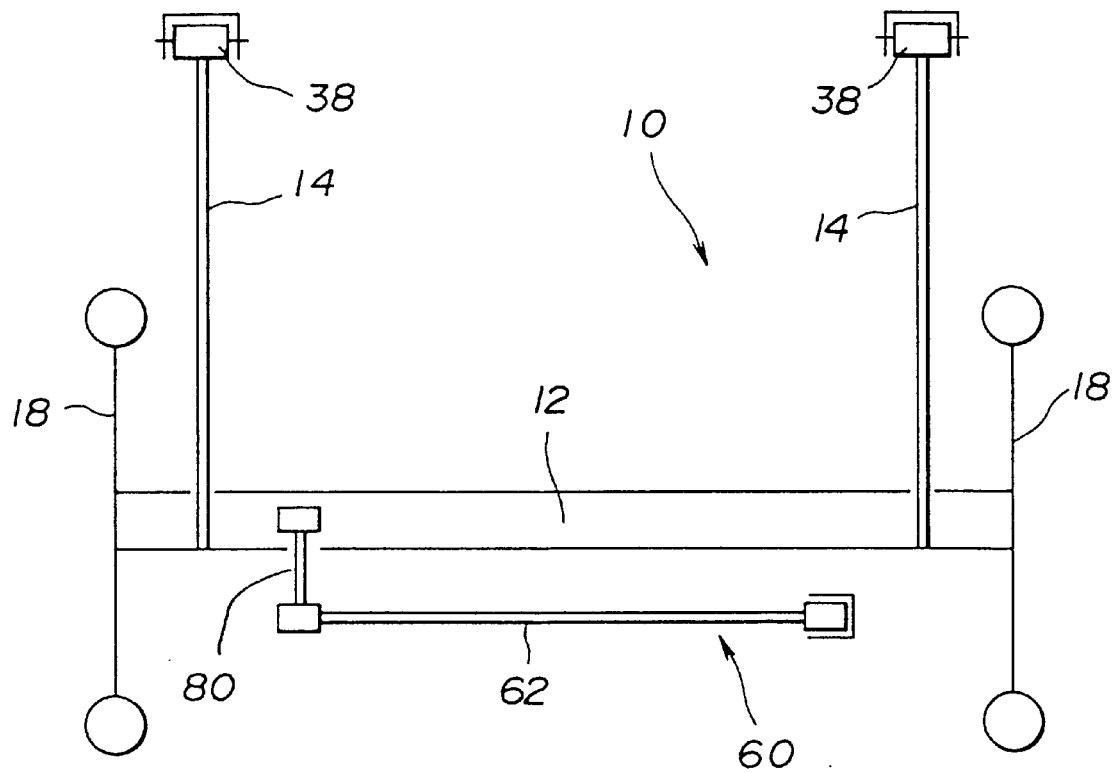
FIG. 9 is a schematic view similar to FIG. 7 showing the third embodiment of a rear suspension apparatus.

With respect to he structure of the linkage mechanism, the control rod 98 may be eliminated. FIG. 9 illustrates a linkage mechanism 60 without such a control rod. In this case, a resilient bushing secures the pivotal connection between a lateral link 62 and a pin 80, so that force and reaction are transmitted by this pivotal connection.

Figure 10:
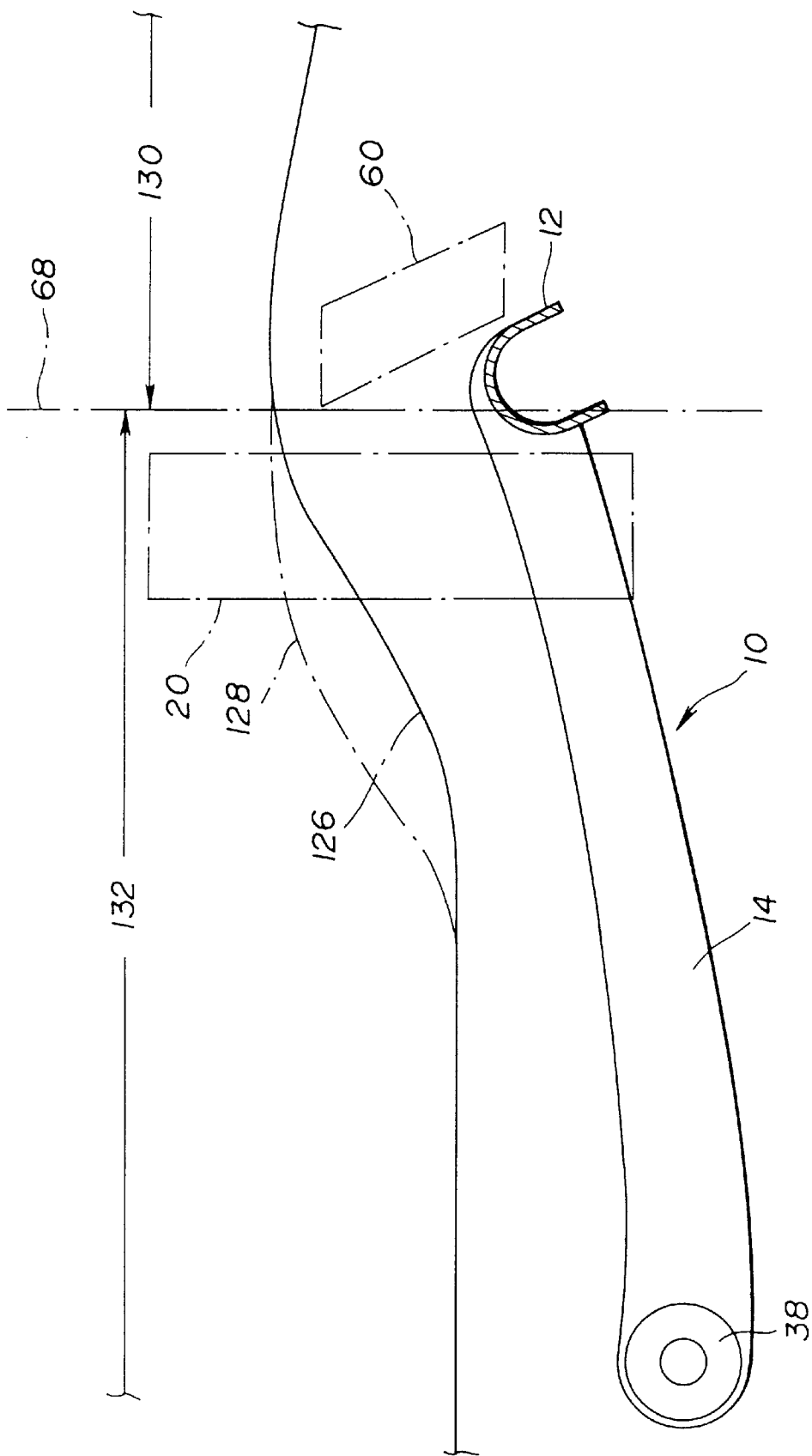
FIG. 10 is a schematic view showing the relationship between the vehicle floor and arrangement of components of the rear suspension apparatus.

In the preceding description, the components of the linkage mechanism 60 are mounted in the proximity of and behind the beam 12. Referring to FIG. 1, this layout of the linkage mechanism 60 leaves a space in front of the beam 12 readily available for mounting the fuel tank 28 of increased volume. Referring to FIG. 10, this layout of linkage mechanism 60 provided added area of generally flat surface extension of the vehicle floor.

FIG. 10 shows the major components of the linkage mechanism in phantom at 60 and the spring and hydraulic unit in phantom at 20 as well as the rear axle 10 including the beam 12, trailing arm 14 and bushing 38. Variations in floor height allowed by this layout against the vehicle longitudinal axis are plotted at 126. For comparison purpose, the variations are plotted and illustrated in phantom at 128 when the major components of linkage mechanism are arranged in front of the beam 12. Specifically explaining, the vehicle floor has a first floor section 130 disposed within the predetermined zone and a second floor section 132 connecting with the first floor section 130 at the vertical plane 68. The first floor section 130 includes a first surface extending above the linkage mechanism 60. Suppose that this first surface has a first floor height. The second floor section 132 includes a second generally flat surface. Suppose that this second generally flat surface has a second floor height that is lower than the first floor height. Viewing the vehicle floor rearwards from the front of the vehicle, the second generally flat surface stretches along the centerline 32 toward the vertical plane 68 further than it would if the linkage mechanism 60 were in front of the beam 12 or outside of the predetermined zone.

Figure 11:
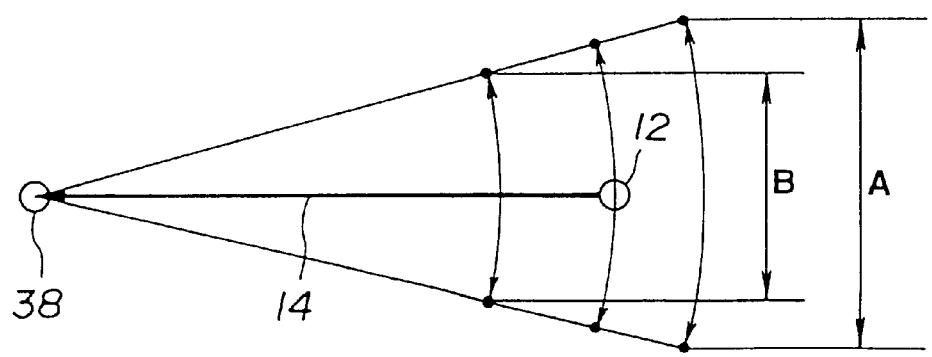
FIG. 11 is a schematic view showing an operational condition of the apparatus according to the invention.

Referring to FIG. 11, let us consider the vertical displacement of the lateral link 62 of the linkage mechanism 60 and a requisite spring constant of the resilient bushings necessary for allowing such displacement. Let us assume that A and K1 represent vertical displacement and spring constant for the case where the linkage mechanism is behind the beam 12, and B and K2 represent displacement and spring constant for the case where the linkage mechanism is in front of the beam 12. Then, the following relation holds, $$K1=(B/A)\times K2.$$

It will be seen from this relation that arranging the mechanism 60 behind the beam 12 of the rear axle 10 is advantageous in this respect. Specifically, the pivotal connections of the lateral link 62 each may include a resilient bushing that posses low rigidity necessary to provide a requisite rotary motion of the lateral link 62. The use of such resilient bushing is advantageous in shock isolation.

Referring to FIG. 12, with respect to the pivot connection of the lateral link 62 with the vehicle body 22, the bracket 64 is provided with a heat insulating structure between the exhaust pipe 30 and resilient bushing 70 to protect the elastic body against heat damage. The sue of such a bracket has made it possible to mount a sufficiently long link transversely across the exhaust pipe. The heat insulating structure of the bracket 64 is not seen in FIG. 12, but is substantially the same as a heat insulating structure to be described later in connection with FIGS. 15 and 16.

Ordinarily, it is required to use additional members to reinforce the connection between the side member 24 and cross member 26 to prevent interference with the exhaust pipe 30. According to the structure shown in FIG. 2, such additional members solely for reinforcement are no longer required. The bracket 64 is rigidly attached at one end to the cross member 26 at two mount points 140. The bracket 64 extends obliquely from the two mount points 140 on the cross member 26 toward mount points 142 on the side member 24. The other end of the bracket 64 is rigidly attached to the side member 24 at the mount points. In order to increase structural rigidity of the bracket 64, a first rigid plate 144 and a second rigid plate 146 are placed on the cross member 26 and side member 24, respectively. The rigid plate 144 is rigidly attached at one end to the cross member 26 at the mount points 14 and at the other end to the side member 24 at a mount point 148. The second rigid plate 146 is rigidly attached at one end to the side member 24 at the mount point 148 and at the other end to the side member 24 at the mount points 142. Appropriate fasteners may secure these connections at each mount point. Oblique extension of the bracket 64 serves as reinforcement between the mount points 140 on the cross member 26 and the mount points 142 on the side member 24.

Figure 15:
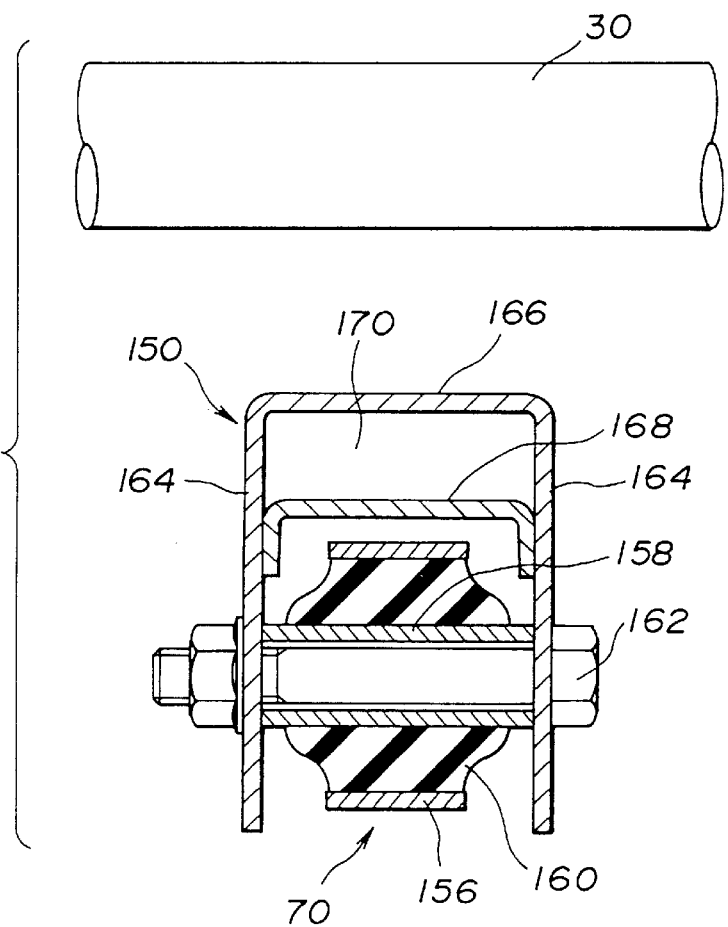
FIG. 15 is an enlarged view taken along the plane indicated by lines 15—15 of FIG. 13.
Figure 16:
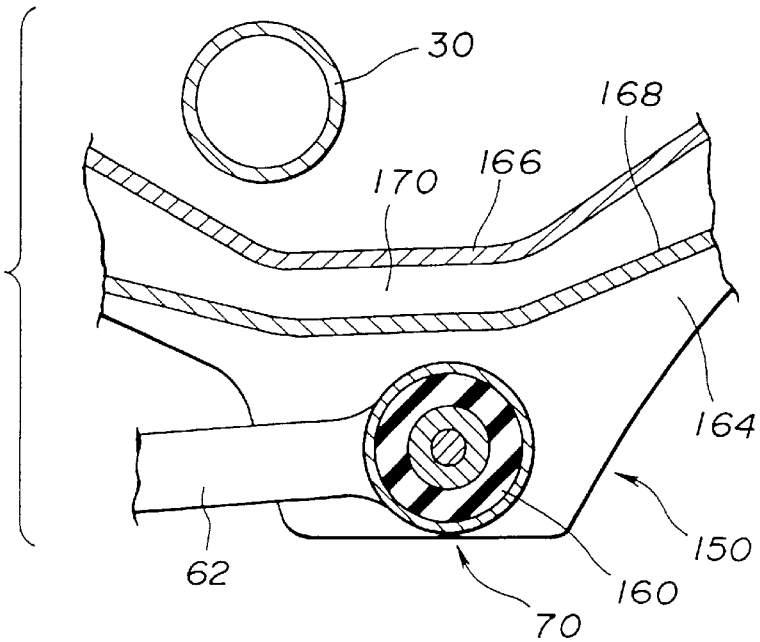
FIG. 16 is an enlarged view taken along the plane indicated by lines 16—16 of FIG. 14.

Referring to FIGS. 13 to 16, a modified bracket 150 including the heat insulating structure is explained. The bracket 150 extends laterally below an exhaust pipe 30 and has one leg or end rigidly attached to a cross member 26 at a mount point 152 and the other leg or end rigidly attached to a side member 24 at a mount point 154 (see FIG. 14). Referring to FIGS. 15 and 16, a bushing 70 includes an outer sleeve 156 incorporated by a lateral link 62, an inner sleeve 158, and a rubber ring 160 bonded to the outer and inner sleeve 156 and 158. A bolt 162 of an appropriate fastener assembly extends through the inner sleeve 158 to hold the bushing 156 between a pair of opposite walls 164 of the bracket 64. These walls 164 are interconnected by a top wall 166 to define a downwards open channel structure as viewed in FIG. 15. As viewed in FIG. 16, the bracket 150 is recessed downwards to avoid interference with the exhaust pipe 30.

Referring to FIGS. 15 and 16, as the heat insulating structure, an intermediate plate 168 extends in spaced relation with the top wall 166 and has sides attached to the opposite walls 164. The intermediate plate 168 is disposed between the top wall 166 and the bushing 70. The intermediate plate 168 adds structural rigidity to the bracket 150. A space 170 defined between the top wall 166 and intermediate plate 168 serves as an air layer.

With respect to the air layer space 170, another air layer or a plurality of such air layers may be provided between the top wall 166 and the bushing 70. This may add further structural strength to the bracket.

With respect to the thickness of the top wall 166, the thickness may be increased sufficiently to provide a requisite amount of heat insulation. In this case, the air layer may no longer be needed.

The heat insulating structure may take any other appropriate forms. For example, a layer of insulating material may be placed on the downwardly facing side of the top wall 166 in addition to or instead of the air layer. Covering the exhaust pipe 30 with an appropriate insulating material is another option. Provision of air ventilation between the exhaust pipe 30 and the bushing 70 may constitute another version of the heat insulating structure.

With respect to the mount points of the bracket 150, the mount points may be concentrated only on the cross member 26 if appropriate structural rigidity is provided.

Figure 17:
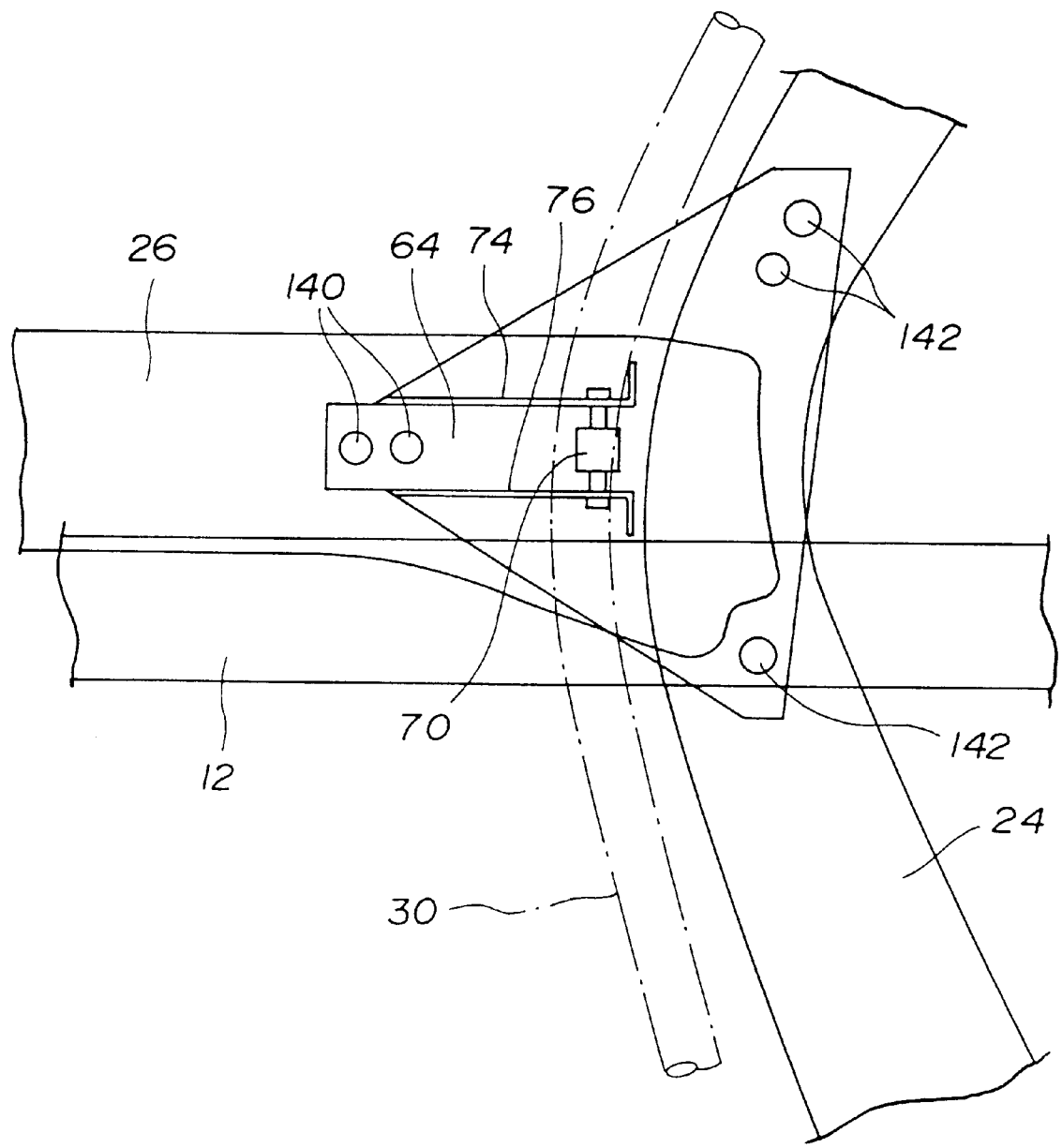
FIG. 17 is a similar view to FIG. 14 showing a modification.

The mount point 152 on the cross member 26 and the mount point 154 on the side member 24 are laterally spaced in the embodiment shown in FIGS. 13 to 16. Referring to FIG. 17, the number of mount points 140 are two on the cross member 26 and the number of mount points 142 are three on the side member 24. The mount points 142 are arranged in the longitudinal direction of the side member 24 and not in line with the mount points 140 on the cross member in the longitudinal direction of the cross member 26. A bracket 64 in this embodiment is similar to the brackets 150 shown in FIGS. 13 to 16. However, this bracket 64 extends not only laterally but also longitudinally with respect to the vehicle body 22 to be rigidly attached to the side member 24 at the mount points 142. The structure adds rigidity to the side and cross members 24 and 26.

With respect to the orientation of axes of the bushings of the linkage mechanism 60, the bushing axes are oriented in parallel to the longitudinal centerline 32 in the preceding description.

Figure 18:
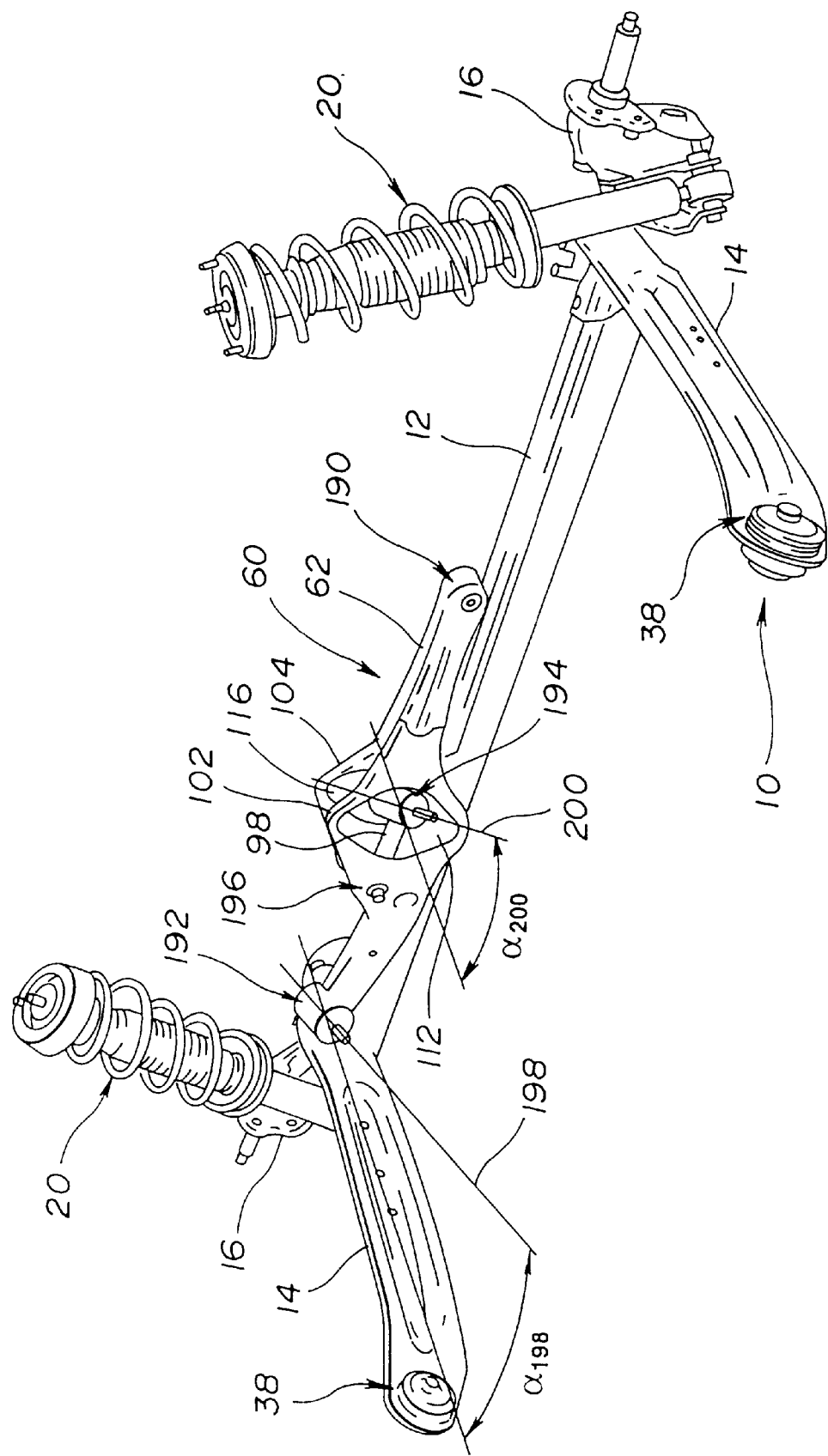
FIG. 18 is a perspective view of the fifth embodiment of a rear suspension apparatus according to the present invention.
Figure 19:
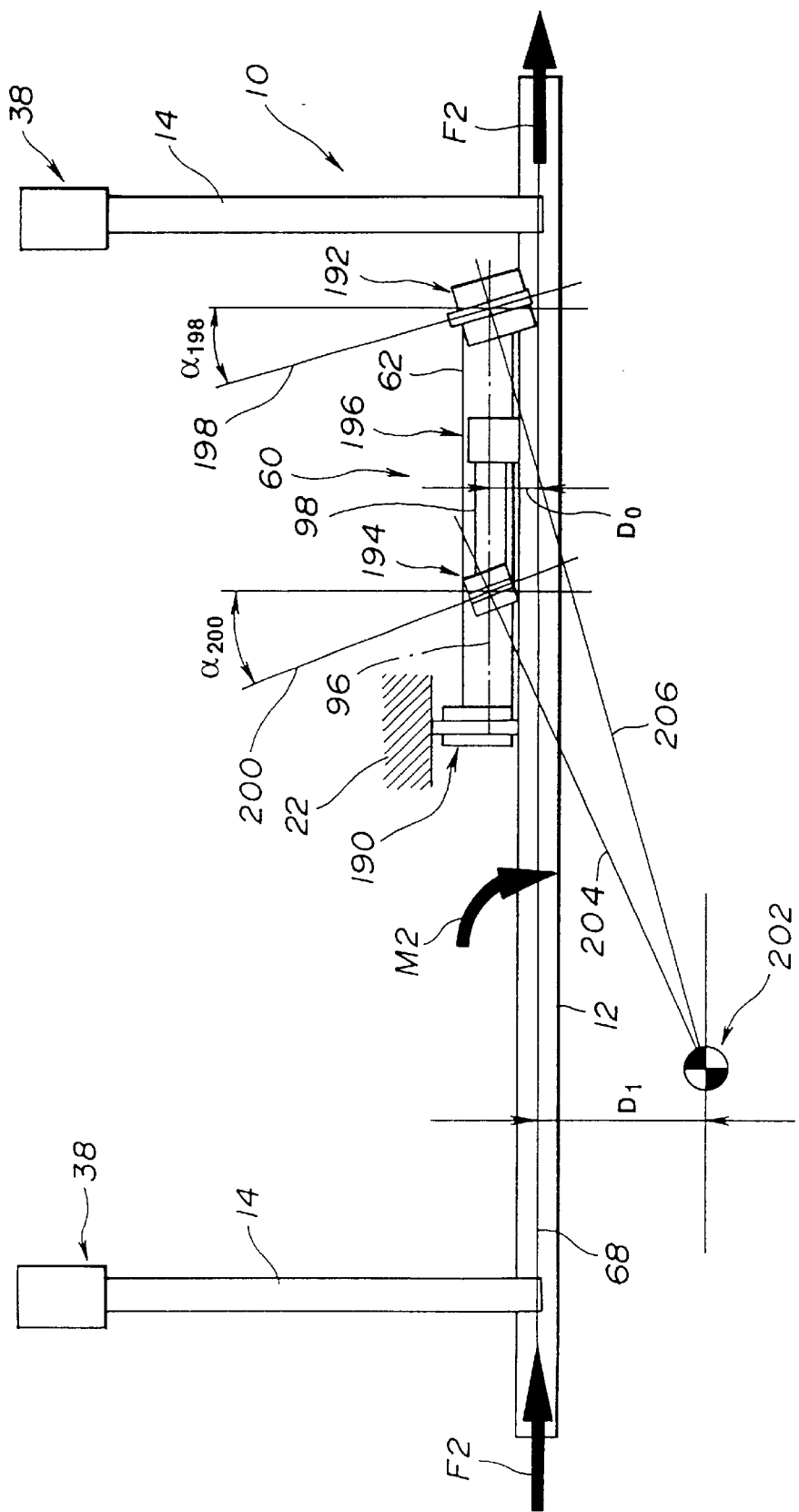
FIG. 19 is a schematic plan view of the apparatus of FIG. 18.

Referring to FIGS. 18 and 19, a linkage mechanism 60 in this embodiment is substantially the same as that of the embodiment shown in FIGS. 1 to 4 in its major components, i.e., a lateral link 62 and a control rod 98. However, the former is different from the latter in the location of the pivotal connection of the linkage mechanism 60 to the vehicle body superstructure 22 and the locations of the two pivotal connections in the linkage mechanism to the beam 12 of the rear axle 10. Another difference resides in that the major components of the linkage mechanism 60 are arranged in front of the beam 12. Still another difference is that the axes of the resilient bushings at the two pivotal connections of the linkage mechanism 60 to the beam 12 are oriented at different angles with respect to the vehicle longitudinal direction.

Viewing in FIG. 19, the link axis 96 is in parallel to the vertical plane 68 and displaced forwards by an amount $D_0$ and the axis of the control rod 98 lies on the link axis 96. For ease of explanation, a pivotal connection between one end of the link 62 and the vehicle body 22 is designated at 190. A pivotal connection between the other end of the link 62 and the beam 12 is designated at 192. A pivotal connection between one end of the control rod 98 and the beam 12 is designated at 194. A pivotal connection between the other end of the control rod 98 and the link 62 is designated at 196. The pivotal connections 190, 192, 194 and 196 each include a resilient bushing of the type having a rubber ring bonded between eccentric inner and outer sleeves.

The pivotal connection 190 is located at a portion of the vehicle body 22 generally above a middle portion of the beam 12. The link 62 extends laterally to the pivotal connection 192. As viewed in FIG. 19, the pivotal connection 194 is disposed between the pivotal connections 190 and 192. Lastly, the pivotal connection 196 is disposed between the pivotal connections 192 and 194. Axes of the resilient bushings of the pivotal connections 190 and 196 are oriented in parallel to the vertical plane including the vehicle longitudinal centerline 32 (ref. FIG. 1). Axis 198 of the resilient bushing of the pivotal connection 192 is oriented at an acute angle $\alpha_{198}$ with respect to the vertical plane including the vehicle longitudinal centerline 32 with its forward end placed inboard. Axis 200 of the resilient bushing of the pivotal connection 194 is oriented at an acute angle $\alpha_{206}$ with respect to the vertical plane including the vehicle longitudinal centerline 32 with its forward end placed inboard. The setting is such that the angle $\alpha_{200}$ is greater than the angle $\alpha_{198}$.

Referring to FIG. 19, when the vehicle negotiates a right turn, a road reaction force or side force F2 exerted on the beam 12 induces a clockwise moment M2 about a center 202, including relative clockwise rotation of the axle 10. This center 202 is displaced rearwards from the vertical plane 68 by an amount $D_1$. This center 202 is defined as a point at which first and second orthogonal lines 204 and 206 cross with other as viewed in FIG. 19. The first orthogonal line 204 intersects the bushing axis 200 at a middle point thereof and is oriented at right angles to the axis 200. The second orthogonal line 206 intersects the bushing axis 198 at a middle point thereof and is oriented at right angles to the axis 198.

From the preceding description, it will be appreciated that, in this embodiment, the orientation of each of the bushing axes 198 and 200 are so determined as to induce the moment about the center 202 that is displaced rearwards from the vertical plane 68 by the amount $D_1$.

Figure 20:
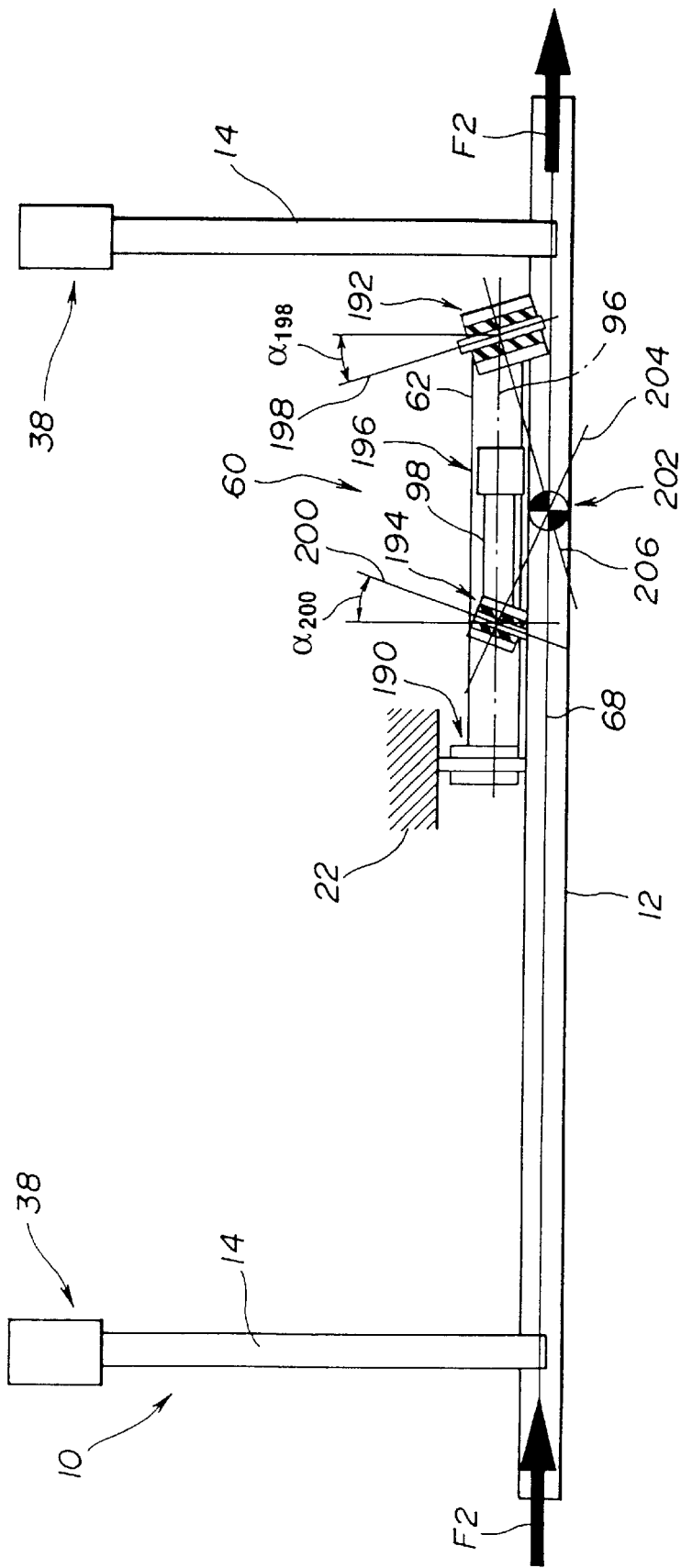
FIG. 20 is a schematic plan view showing the sixth embodiment of a rear suspension apparatus according to the present invention.

Referring to FIG. 20, this embodiment is substantially the same as the embodiment illustrated in FIG. 19 except the orientation of bushing axis 200. The axis 200 is oriented at an acute angle $\alpha_{200}$ with respect to the vertical plane including the vehicle longitudinal centerline 32 with its forward end placed outboard. The setting of the orientations of the bushing axes 200 and 198 is determined such that a center 202 of moment lies within the vertical plane 68 or it is slightly displaced rearwards from the vertical plane 68.

Figure 21:
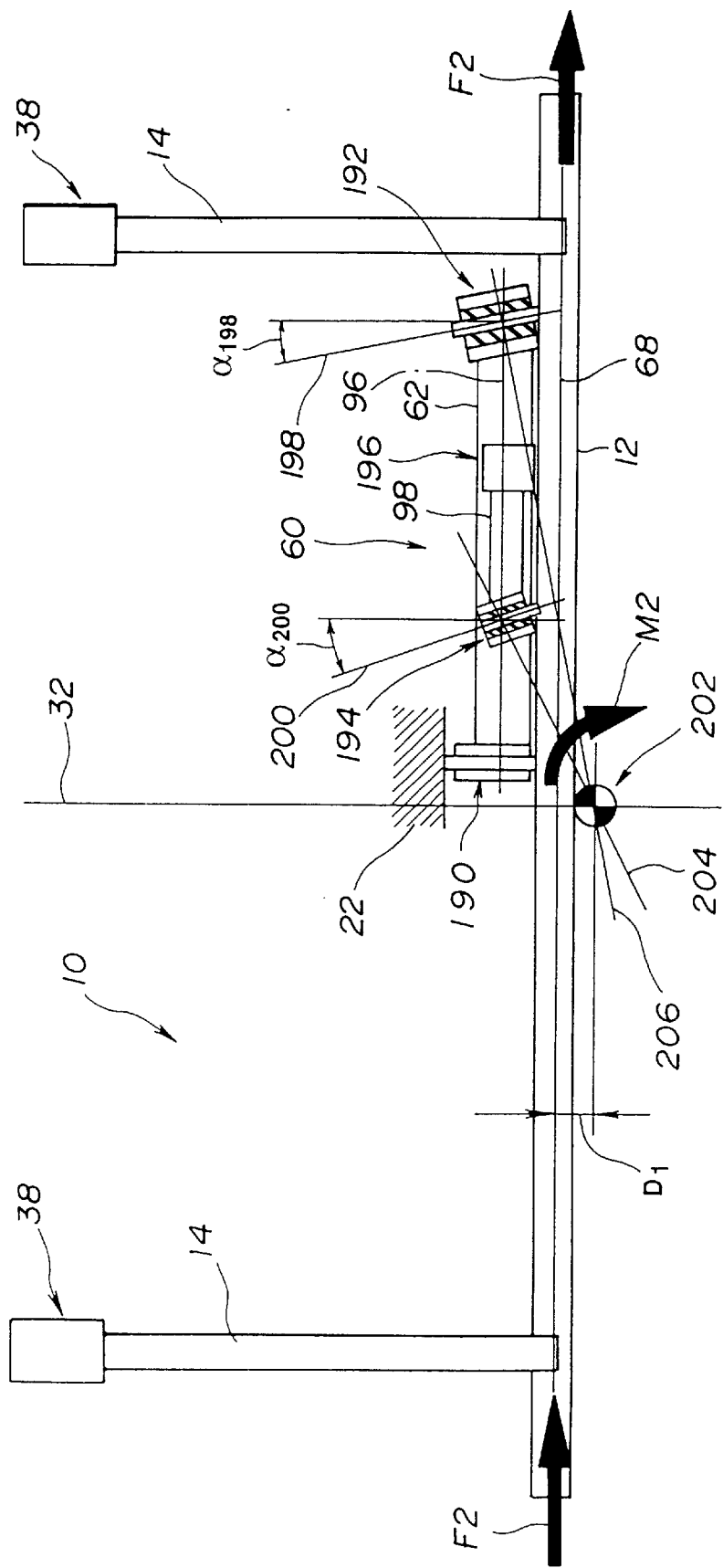
FIG. 21 is a schematic plan view showing the seventh embodiment of a rear suspension apparatus according to the present invention.
Figure 22:
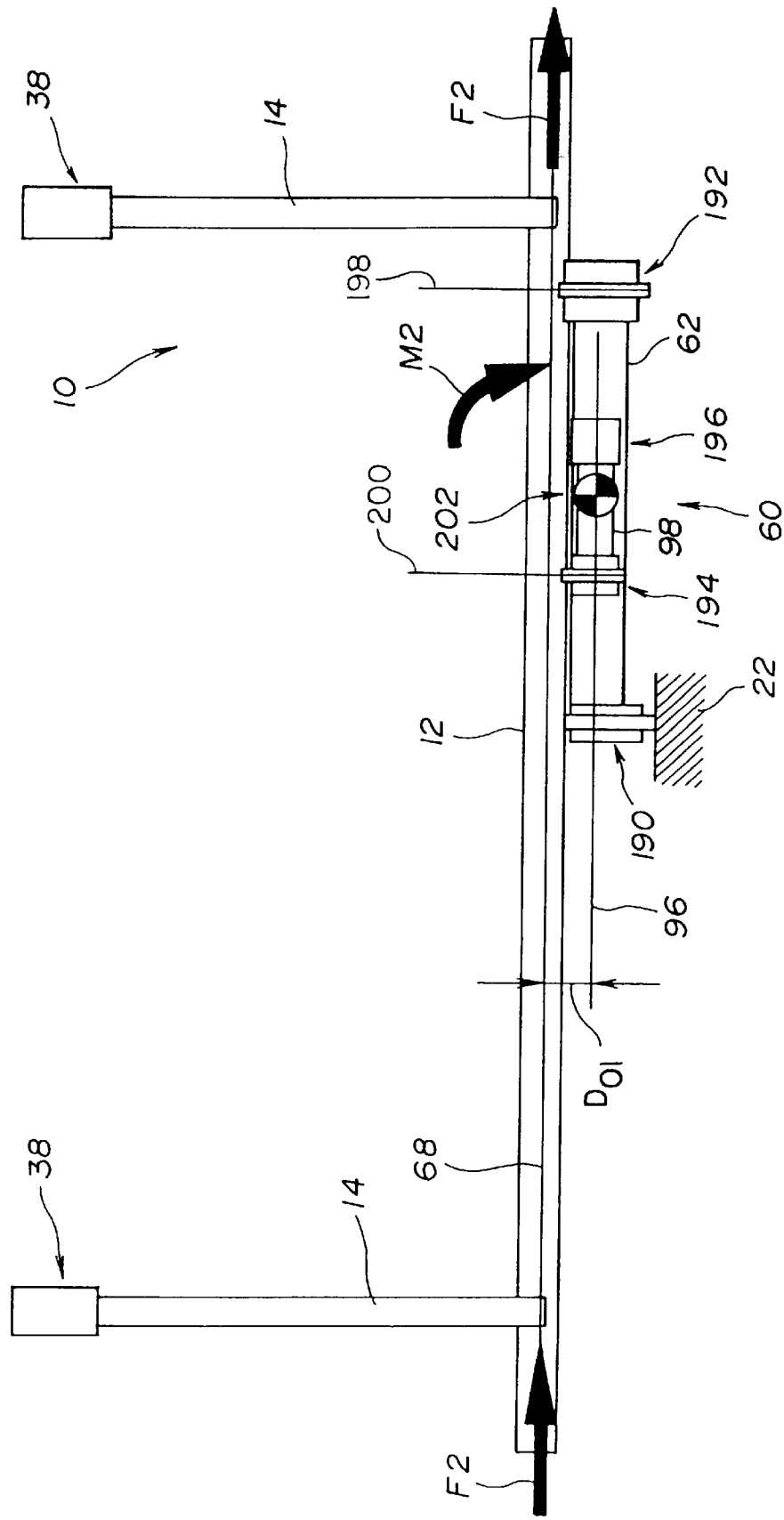
FIG. 22 is a schematic plan view showing the eighth embodiment of a rear suspension apparatus according to the present invention.

The embodiment of FIG. 21 is substantially the same as the embodiment of FIG. 19. The difference resides in the setting of the angles $\alpha_{198}$ and $\alpha_{200}$. In this embodiment, they are set so that the center 202 of moment lies in the vertical plane including the vehicle longitudinal centerline 32 and it is displaced rearwards from the vertical plane 68.

Referring to FIG. 21, this embodiment is substantially the same as the embodiment of FIG. 19. However, this embodiment is different from that of FIG. 19 in that a linkage mechanism 60 is arranged behind a beam 12 with its link axis 96 displaced rearwards from the vertical plane 68 by an amount $D_0$. Another difference is that bushing axes 198 and 200 are oriented in parallel to the vertical plane including the vehicle longitudinal centerline 32. In this case, center 202 of moment is on the link axis. Thus, the center 202 is displaced rearwards from the vertical plane 68 by an amount $D_1$ that is equal to $D_0$.

Figure 23:
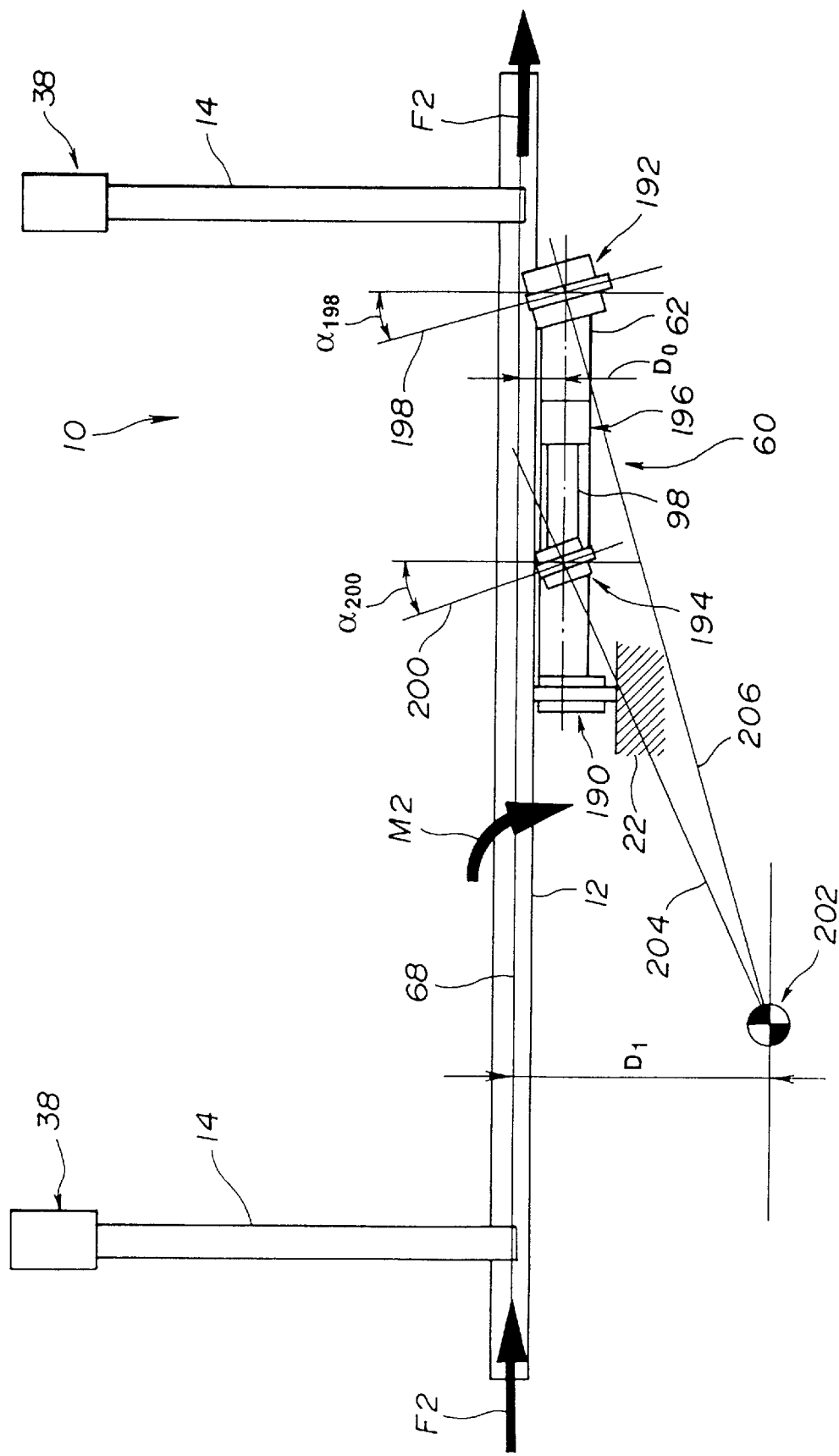
FIG. 23 is a schematic plan view showing the ninth embodiment of a rear suspension apparatus according to the present invention.

Referring to FIG. 23, this embodiment is substantially the same as the embodiment of FIG. 19 except the location of the link axis 96. The link axis 96, in this embodiment is displaced rearwards from the vertical plane 68 by an amount $D_0$ so that the link 62 with the control road 98 is behind the beam 12.

Figure 24:
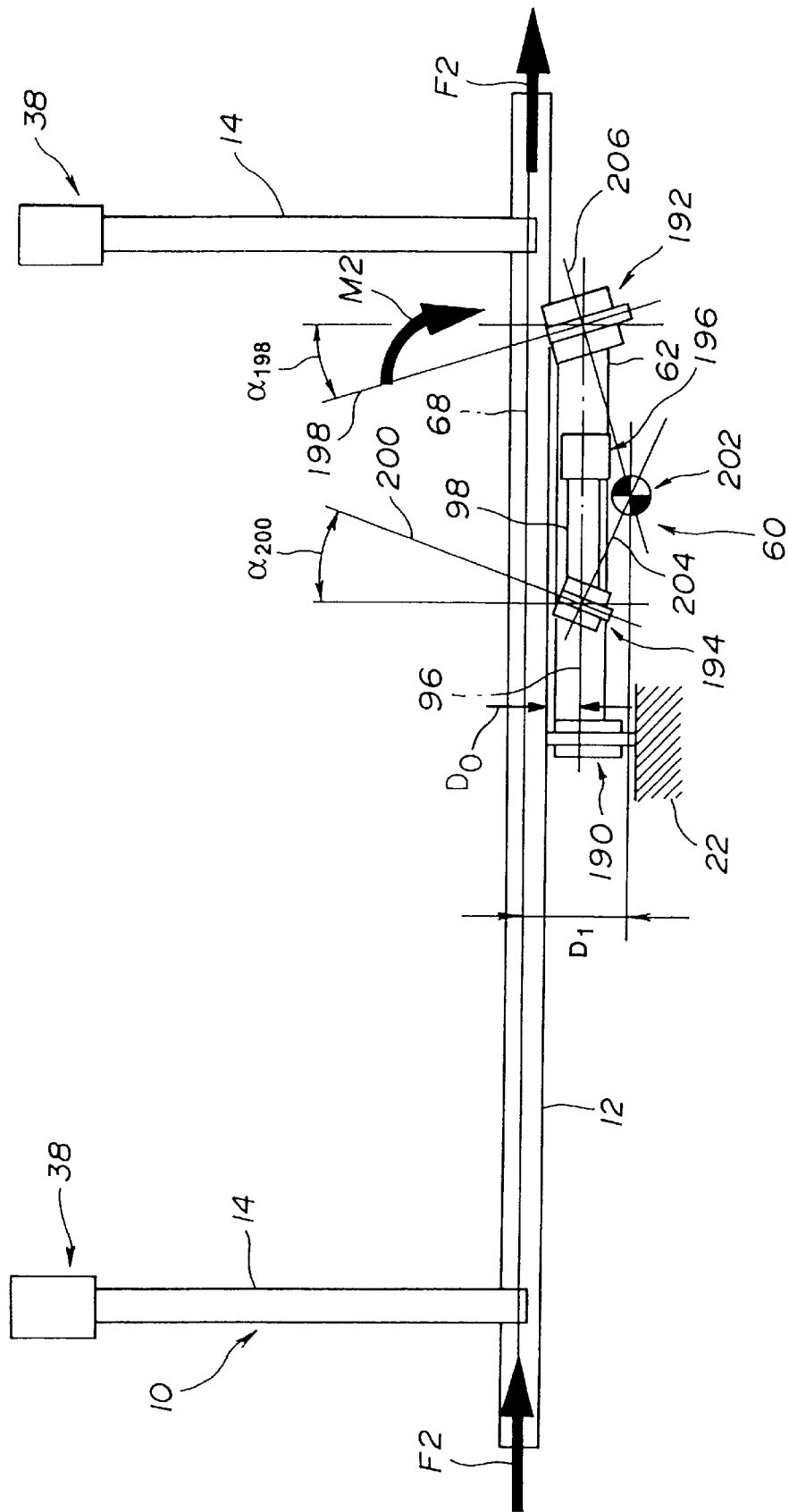
FIG. 24 is a schematic plan view showing the tenth embodiment of a rear suspension apparatus according to the present invention.

Referring to FIG. 24, this embodiment is substantially the same as the embodiment of FIG. 20 except the location of the link axis 96. The link axis 96, in this embodiment is displaced rearwards from the vertical plane 68 by an amount $D_0$ so that the link 62 with the control rod 98 is behind the beam 12.

Figure 25:
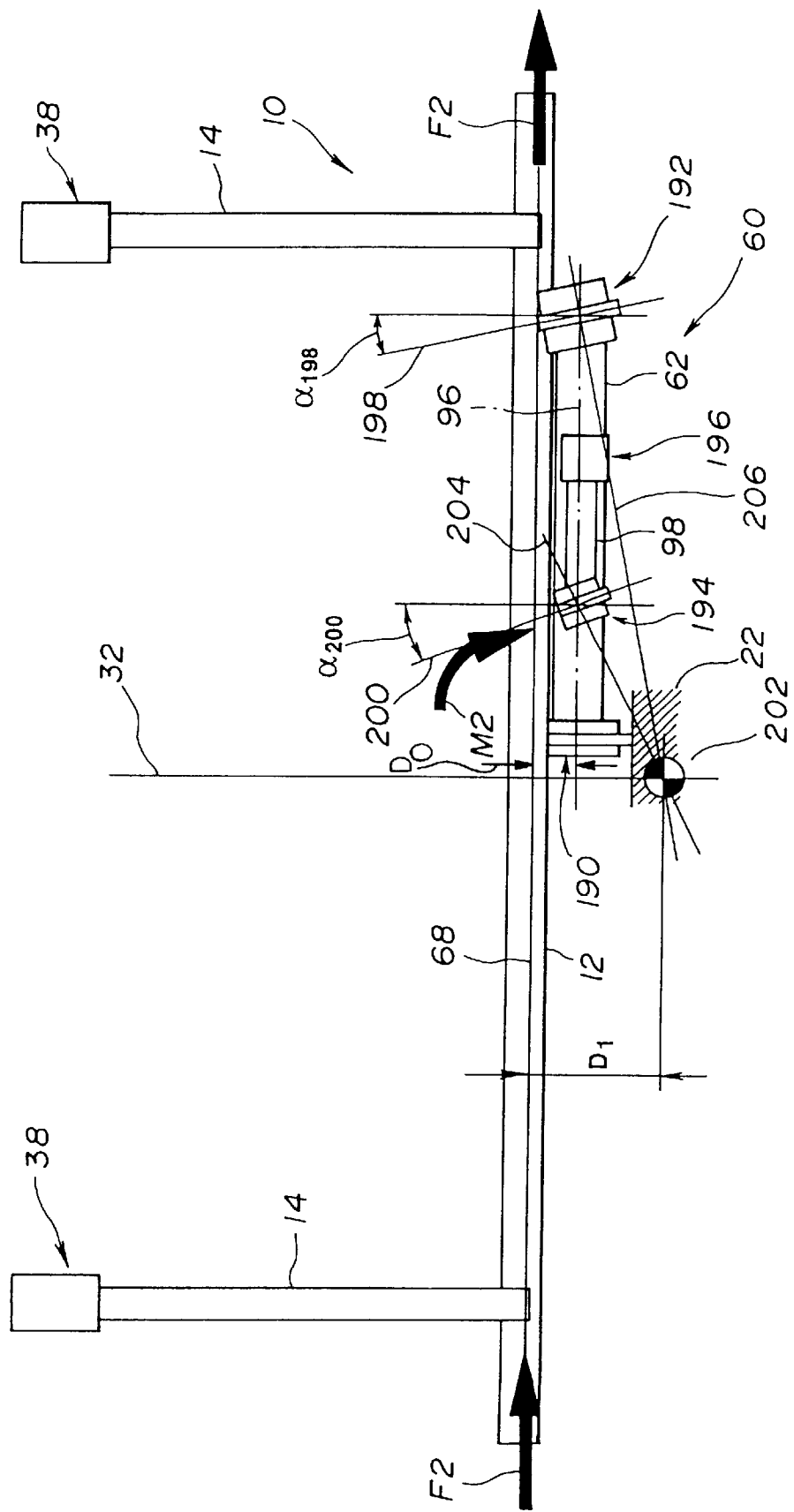
FIG. 25 is a schematic plan view showing the eleventh embodiment of a rear suspension apparatus according to the present invention.
Figure 26:
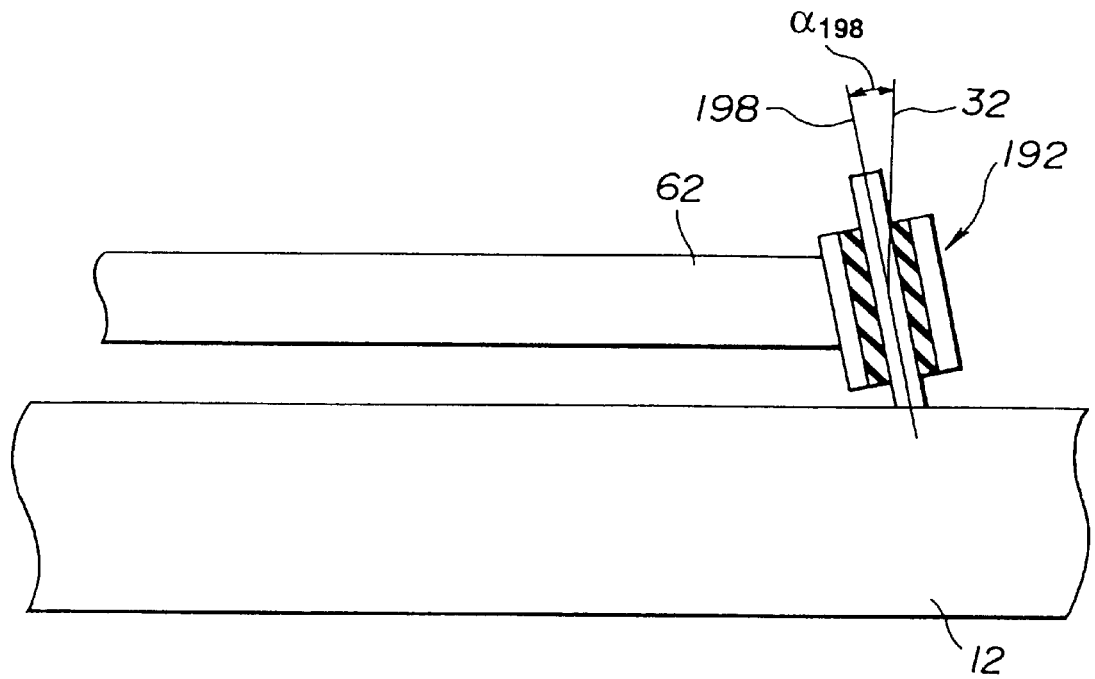
FIGS. 26 and 27 are schematic views showing modifications of a resilient bushing operatively connected between a beam of an axle and a lateral link.

Referring to FIG. 25, this embodiment is substantially the same as the embodiment of FIG. 21 except the location of the link axis 96. The link axis 96, in this embodiment is displaced rearwards from the vertical plane 68 by an amount $D_0$ so that the link 62 with the control rod 98 is behind the beam 12.

Referring to FIGS. 26 to 29, FIGS. 26 and 28 show pivotal connections 192 and 194, respectively, each including a resilient bushing of the type having a rubber ring bonded to eccentric outer and inner sleeves. To orient the bushing axis at an angle with respect to the vehicle longitudinal centerline a pin rigidly attached to the beam 12 is oriented at the angle.

Figure 27:
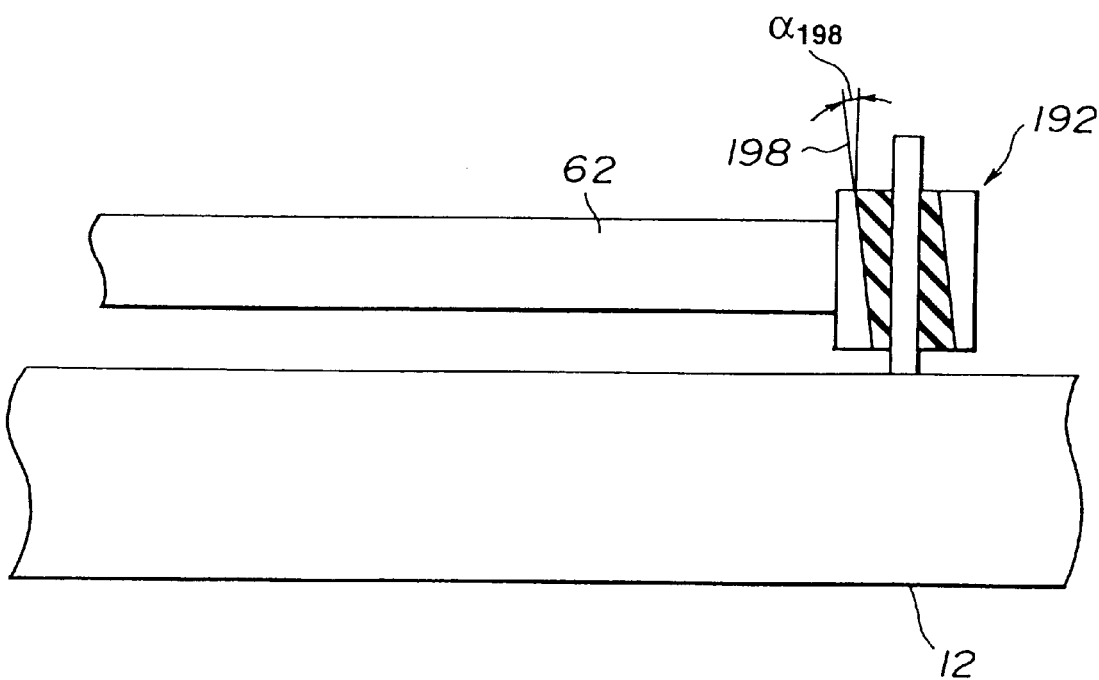
Figure 28:
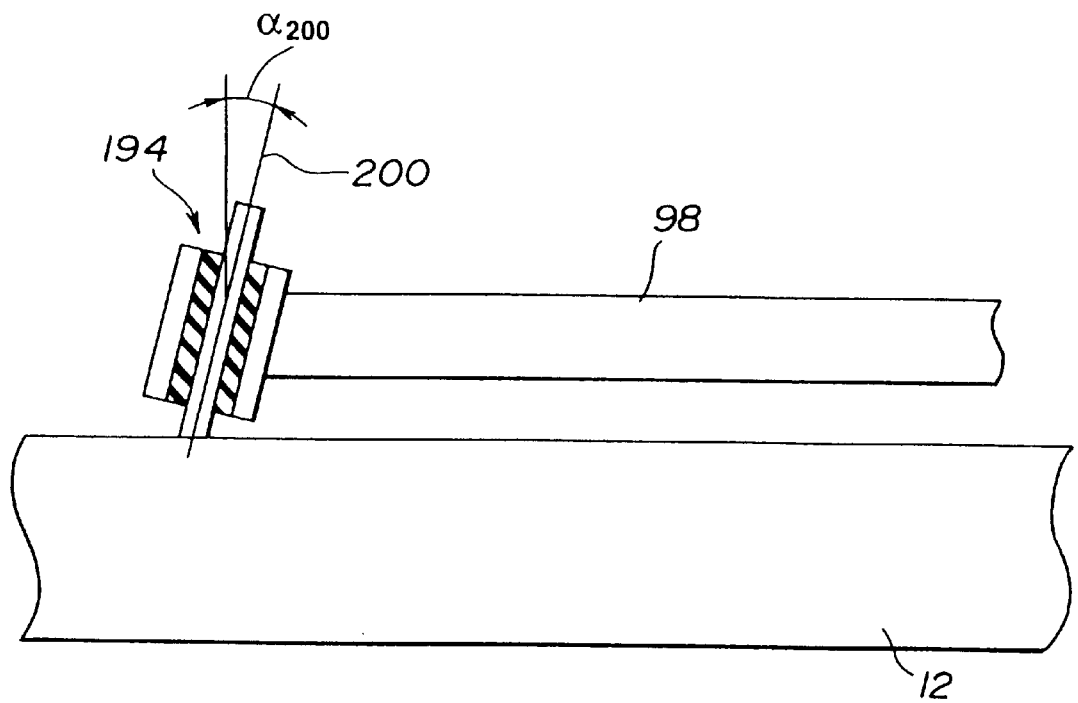
FIGS. 28 and 29 are schematic views showing modifications of a resilient bushing operatively connected between the beam and a control rod.
Figure 29:
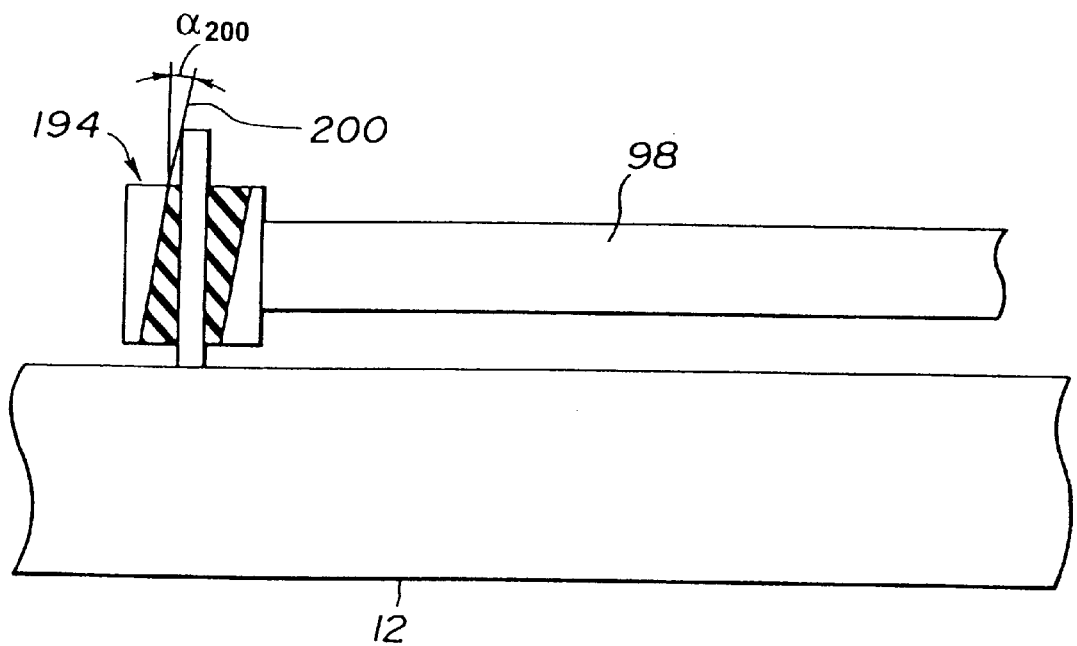

FIGS. 27 and 29 show pivotal connections 192 and 194, respectively, each including a modified resilient bushing. According to this modified resilient bushing, an outer sleeve has a cylindrical inner wall having a cylinder axis oriented at an angle with respect to the vehicle longitudinal centerline. A rubber ring is bonded to the cylindrical inner wall of the outer sleeve and an inner sleeve. An axis of the inner sleeve is oriented in parallel to the vehicle longitudinal centerline so that such modified bushing may be mounted on a pin that is oriented in parallel to the vehicle longitudinal centerline. Thus, the angled pin for mounting the resilient bushing for the pivotal connection is no longer needed.

What is claimed is:

1. In a vehicle, a combination comprising:

a vehicle superstructure;

an axle including a pair of trailing arms each having one end pivotally connected to the vehicle superstructure and a beam connected to said pair of trailing arms, said axle having wheel supports;

an interconnecting assembly connecting said axle with the vehicle superstructure; and a linkage mechanism operatively connected between the vehicle superstructure and said beam, so that, under force causing lateral displacement of said axle, said linkage mechanism includes moment on said beam to counteract oversteer tendency due to said lateral displacement of said axle, wherein said linkage mechanism includes a link that is stressed along a length thereof upon exerting force on said beam along a length thereof, wherein the vehicle superstructure includes an exhaust pipe and a bracket, and wherein said linkage mechanism includes a resilient bushing, said resilient bushing comprising generally concentric inner and outer rigid elements connected one to said link and the other to said bracket, and an elastic body between said inner and outer elements, said bracket including a heat insulating structure between the exhaust pipe and said resilient bushing.

2. The combination as recited in claim 1, wherein said link has a link axis lying within a predetermined zone, said predetermined zone being bounded by a vertical plane, which is vertical with respect to the vehicle superstructure and bisects each wheel support of said axle, and extending rearwards with respect to the vehicle longitudinal centerline from said vertical plane.

3. The combination as recited in claim 2, wherein said linkage mechanism includes a control rod connected between said beam and said link, and a first anisotropic resilient bushing, said first anisotropic resilient bushing comprising generally concentric inner and outer rigid elements connected one to said beam and the other to said link, and an anisotropic structure including an elastic body between said inner and outer elements.

4. The combination as recited in claim 1, wherein the vehicle superstructure includes a pair of side members and a cross member connected between said pair of side members, and wherein said bracket is rigidly attached to the cross member and also to one of said pair of side members in a manner to cross the exhaust pipe.

5. The combination as recited in claim 4, wherein said bracket extends obliquely from the cross member to said one side member.

6. The combination as recited in claim 1, wherein said heat insulating structure includes a plurality of plates that define space therebetween.

7. The combination as recited in claim 1, wherein said bracket includes a pair of opposite walls and said resilient bushing is mounted between said opposite walls.

8. In a vehicle having a vehicle longitudinal centerline, a combination comprising:

a vehicle superstructure including a pair of side members, which extend generally along the vehicle longitudinal centerline, a cross member rigidly attached at one and the other ends to said side members, respectively, and a bracket rigidly attached at one end to said cross member and at the other end to one of said side members within an area disposed rearwardly of said cross member;

an axle including a pair of trailing arms each having one end pivotally connected to said vehicle superstructure and a beam connected to said pair of trailing arms, said axle having wheel supports;

said cross member being disposed in the neighborhood of said beam, an interconnecting assembly connecting said axle with said vehicle superstructure; and a linkage mechanism operatively connected between said vehicle superstructure and said beam, so that, under force causing lateral displacement of said axle, said linkage mechanism includes moment on said beam to counteract oversteer tendency due to said lateral displacement of said axle, wherein said linkage mechanism includes a link that is attached at one end to said bracket so that it is stressed along a length thereof upon exerting force on said beam along a length thereof, wherein said linkage mechanism includes a control rod between said beam and said link, wherein said link and said control rod have link and control rod axes lying within a predetermined zone, said predetermined zone being bounded by a vertical plane that is vertical with respect to said vehicle superstructure and bisects each wheel support of said axle, and extending rearwards with respect to said vehicle longitudinal centerline from said vertical plane, wherein said linkage mechanism includes a first anisotropic resilient bushing, said first anisotropic resilient bushing comprising generally concentric inner and outer rigid elements connected one to said beam and the other to said link, and an anisotropic structure including an elastic body between said inner and other elements, and wherein said vehicle superstructure includes a floor, said floor having a first floor section within said predetermine zone and a second floor section, outside of said predetermined zone, connecting with said first floor section at said vertical plane, said first floor section including a first surface generally above said linkage mechanism, said first surface having a first floor height, and said second floor section including a second generally flat surface having a second floor height that is lower than said first floor height, said second generally flat surface stretches along the vehicle longitudinal centerline toward said predetermined zone.

9. In a vehicle having a vehicle longitudinal centerline, a combination comprising:

a vehicle superstructure including a pair of side members, which extend generally along the vehicle longitudinal centerline, a cross member rigidly attached at one and the other ends to said side members, respectively, and a bracket rigidly attached at one end to said cross member and at the other end to one of said side members within an area disposed rearwardly of said cross member;

a pair of trailing arms, each having one end pivotally connected to one of said pair of side members of said vehicle superstructure;

a beam connected to said pair of trailing arms, said beam having an axis;

a pair of wheel support members connected to one and the other ends of said beam;

resilient bushings disposed between said pair of trailing arms and said pair of side members, respectively;

a linkage mechanism including a link connected at one end to said beam and at the other end to said bracket, and a control rod connected to said beam and said link; and said linkage mechanism being disposed rearwardly of said axis of said beam with respect to a forward travel direction of the vehicle, wherein said vehicle superstructure includes, a first floor section disposed generally above said linkage mechanism and rearwardly of said axis of said beam with respect to the forward travel direction of the vehicle, said first floor section having a first floor height; and a second floor section disposed forwardly of said axis of said beam with respect to the forward travel direction of the vehicle, said second floor section having a second floor height that is lower than said first floor height.

* * * * *